United States Patent
Madhavarapu et al.

(10) Patent No.: US 7,231,397 B2
(45) Date of Patent: Jun. 12, 2007

(54) METHOD AND SYSTEM FOR TRANSACTED FILE OPERATIONS OVER A NETWORK

(75) Inventors: Pradeep Jnana Madhavarapu, Bellevue, WA (US); Shishir Pardikar, Redmond, WA (US); Balan Sethu Raman, Redmond, WA (US); Surendra Verma, Bellevue, WA (US); Jon Cargille, Bellevue, WA (US); Jacob Lacouture, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 476 days.

(21) Appl. No.: 10/693,658

(22) Filed: Oct. 24, 2003

(65) Prior Publication Data

US 2005/0091187 A1 Apr. 28, 2005

(51) Int. Cl.
*G06F 17/00* (2006.01)
*G06F 15/06* (2006.01)
*G06Q 40/00* (2006.01)

(52) U.S. Cl. .................. 707/101; 707/102; 705/75; 709/218

(58) Field of Classification Search ........ 707/101–102; 705/75
See application file for complete search history.

(56) References Cited

U.S. PATENT DOCUMENTS

| 5,261,051 | A | 11/1993 | Masden et al. |
| 5,437,013 | A | 7/1995 | Rubin et al. |
| 6,061,708 | A | 5/2000 | McKeehan et al. |
| 6,237,018 | B1 | 5/2001 | Chessell |
| 6,301,601 | B1 | 10/2001 | Helland et al. |
| 6,314,437 | B1 | 11/2001 | Starek et al. |
| 6,317,773 | B1 | 11/2001 | Cobb et al. |
| 6,463,456 | B1 | 10/2002 | Kan et al. |
| 6,493,826 | B1 | 12/2002 | Schofield et al. |
| 6,529,932 | B1 | 3/2003 | Dadiomov et al. |
| 6,542,922 | B1 | 4/2003 | Chessell et al. |
| 6,553,384 | B1 | 4/2003 | Frey et al. |
| 6,609,200 | B2 | 8/2003 | Anderson et al. |
| 2002/0078174 | A1* | 6/2002 | Sim et al. .................. 709/219 |
| 2002/0156713 | A1 | 10/2002 | Gaini |

OTHER PUBLICATIONS

Liu et al., "Relaxed Atomic Commit for Real-Time Transactions in Mobile Computing Enviornment," College of Computer Science & Technology of Huazhong University of Science & Technology, China, pp. 397-408, 2002.
Zhao et al., "Unification of Replication and Transaction Processing in Three-Tier Architectures," IEEE, Department of Electrical and Computer Engineering, University of California, pp. 290-297, 2002.
Madria S.K. and Bhargava, B., "A Transaction Model to Improve Data Availability in Mobile Computing," Distributed and Parallel Databases, 10, Kluwer Academic Publishers, pp. 127-160, 2001.
San-Yih Hwang, "On Optimistic Methods for Mobile Transactions," Department of Information Management, National Sun Yat-Sen University, Journal of Information Science and Engineering, 16, 535-554, 2000.

(Continued)

*Primary Examiner*—Alford W. Kindred
(74) *Attorney, Agent, or Firm*—Lee & Hayes, PLLC

(57) ABSTRACT

A system to perform transacted remote file operations over a network includes a client and a server. The client and server each include a transaction manager (TM) and a file system (FS). The client also includes a redirector (RDR), while the server includes a server application (SRV). The RDR receives a request for a remote transacted file operation. In response, the RDR retrieves the transaction from the request. The RDR may use the TM to marshall the transaction for transmission to the server. The RDR sends the transaction to the server over the network. The SRV component receives the transaction, which the TM and FS of the server then use to perform the file operation. The server then returns the file operation result to the client via the network.

38 Claims, 9 Drawing Sheets

OTHER PUBLICATIONS

Taekyung Byun and Songchun Moon, "Nonblocking Two-Phase Commit Protocol to Avoid Unnecessry Transaction Abort for Distributed Systems," Journal of Systems Architecture, 43, pp. 245-254, 1997.

Tatsunori et al., "Nested Transactions Based Reliable Distributed Computing Environment for a Network of Workstations," Transactions of Information Processing Society of Japan, vol. 33, No. 11, pp. 1384-1392, Nov. 1992.

* cited by examiner

| | OPERATION | HANDLE RETURNED | TRANS-ACTION | VERSION SEEN |
|---|---|---|---|---|
| 401 | OPEN FOR READ | H1 | T1 | A |
| 402 | OPEN FOR READ | H2 | T2 | A |
| 403 | OPEN FOR WRITE | H3 | T2 | B |
| 404 | OPEN FOR READ | H4 | T2 | B |
| 405 | OPEN FOR READ | H5 | T3 | A |
| 406 | COMMIT T2 | | T2 | |
| 407 | OPEN FOR READ | H6 | T1 | C |
| 408 | OPEN FOR READ | H7 | T3 | C |

FIG. 4

ACL
810

ACE #1: SID #1...RIGHTS #1

ACE #2: SID #2...RIGHTS #2

ACE #3: SID #3...RIGHTS #3

ACE #4: SID #4...RIGHTS #4

ACE #5: SID #5...RIGHTS #5

ACE #6: SID #6...RIGHTS #6

ACE #7: SID #7...RIGHTS #7

ACE #8: SID #8...RIGHTS #8

ACE #9: SID #9...RIGHTS #9

ACE #10: SID #10...RIGHTS #10

ACE #11: SID #11...RIGHTS #11

ACE #12: SID #12...RIGHTS #12

FIG. 8

METHOD AND SYSTEM FOR TRANSACTED FILE OPERATIONS OVER A NETWORK

FIELD

Various embodiments described below relate generally to network communication and, more particularly but not exclusively to, methods and systems for enabling transacted file operations over a network.

BACKGROUND

Transactions have long been provided for by databases and transaction-processing systems. Transactions provide a simplified failure model, desirable to application programmers, by grouping together a number of operations into a single atomic operation, i.e., a group of operations of which the results of the individual operations stand or fall together. If just one operation fails, the effects of all operations in the group, regardless of the number of operations associated with the transaction, are "undone" or rolled back. This solidarity among operations is provided with regard to any number of failures, and eventually the respective transaction-processing system reaches one of two states whereby either all of the operations have been applied or none of the operations have been applied.

SUMMARY

In accordance with aspects of the various described embodiments, a method and system to transact file operations over a network is provided. In one aspect, a computing platform (i.e., client) can remotely access a file on another computing platform (i.e., server) via the network. In this aspect, the client and server each include a transaction manager (TM) and a file system (FS). The client also includes a redirector (RDR), while the server includes a server component (SRV).

In operation, the RDR receives a request for a remote transacted file operation. In response to the request, the RDR looks up the transaction from the request and has the transaction marshalled for transmission to the server (e.g., by the TM in one embodiment). The RDR then sends the transaction information (e.g., a marshall blob in one embodiment) to the server over the network. The SRV receives the transaction information, which the TM and FS of the server then use to perform the file operation. The server then returns the file operation result to the client via the network.

In another aspect, the RDR allows more than one remote file operation transaction to be open for a file. When the RDR receives a new request for a transacted remote file operation, the RDR determines whether a "dirty" version of the remote file (i.e., a version that has been written to) is known on the client. The RDR then uses the dirty version for the new request instead of the original version of the file. In some embodiments, the RDR only allows a single transacted write operation to be open at a time for a given file.

In yet another aspect, the RDR determines whether a new request for a transacted remote file operation can use file information already known on the client. If the same file information can be used, the RDR uses this same file information rather than store another copy of the file information.

In still a further aspect, the RDR may associate an opportunistic lock with transactions for a given remote file. In one embodiment, the lock does not prevent local server access to the file, but does cause the server to send a message to the client that the lock was broken. The RDR can then check whether a lock was broken for a given file in determining whether a new request for a transacted remote file operation can use file information already cached in the client.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 4 shows an example of multiple remote file accesses by the client and server of FIG. 2;

FIG. 8 shows an example of a security feature; and

DETAILED DESCRIPTION

Example Network Environment

Figure 1:
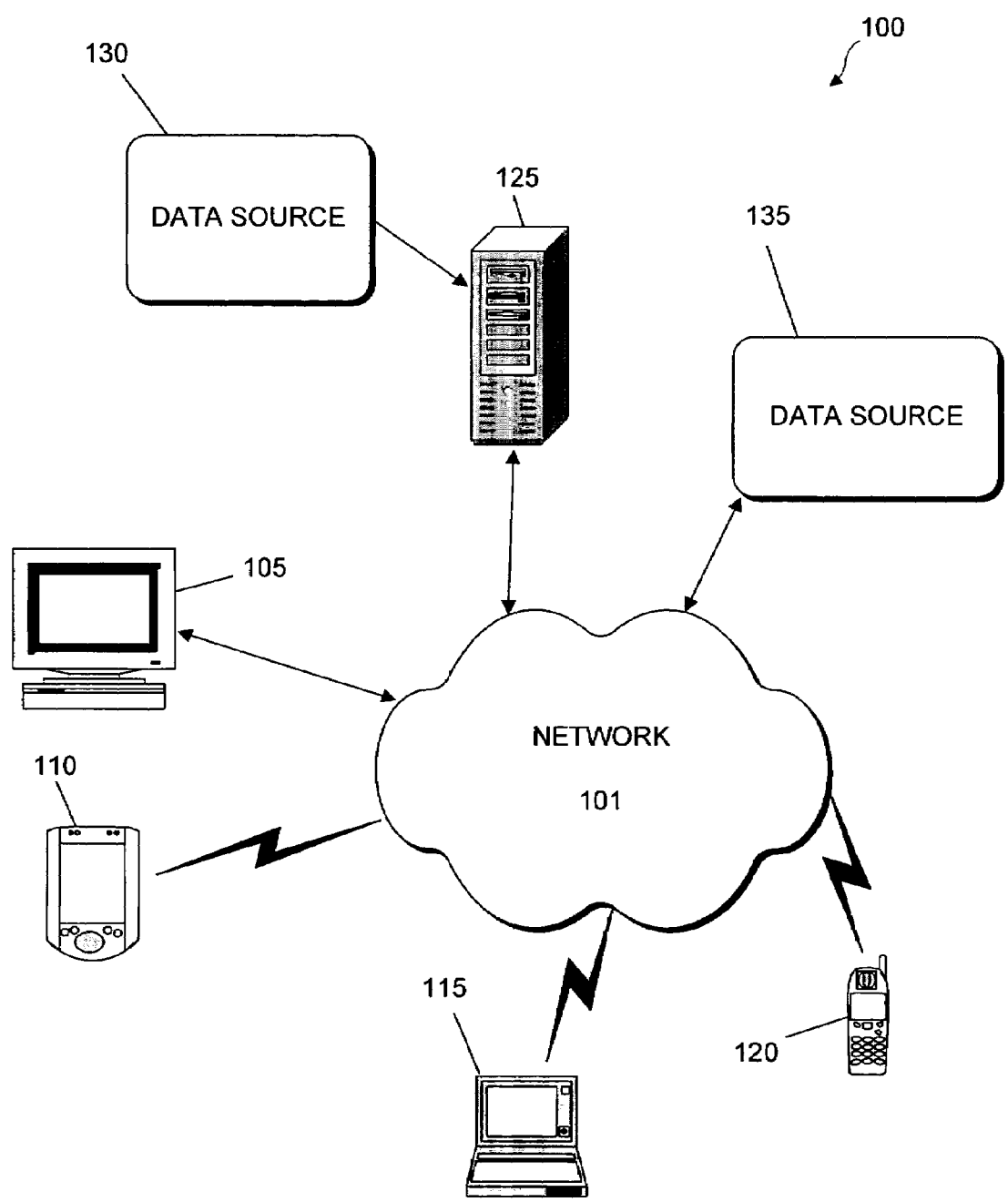
FIG. 1 shows an example of a system capable of using transacted remote file operation.

As previously described, transactions have been used in database and transaction processing systems, but in the following embodiments transactions are used for remote file operations. FIG. 1 illustrates a system 100 in which a client can transact file operations on a client via a network 101. In the example network environment of FIG. 1, multiple client computing devices 105, 110, 115, and 120, which may also be referred to as client devices, are coupled to at least one server device 125 via network 101. Network 101 is intended to represent any of a variety of conventional network topologies and types, which may include wired and/or wireless networks. Network 101 may further utilize any of a variety of conventional network protocols, including public and/or proprietary protocols. Network 101 may include, for example, the Internet as well as possibly at least portions of one or more local area networks (LANs), wide area networks (WANs), etc.

Client device 105 may include any of a variety of conventional computing devices, including, but not limited to, a desktop personal computer (PC), workstations, mainframe computers, Internet appliances, and gaming consoles. Further client devices associated with network 101 may include personal digital assistant (PDA) 110, laptop computer 115, and cellular telephone 120, etc., which may be in communication with network 101 by a wired and/or wireless link. Further still, one or more of client devices 105, 110, 115, and 120 may include the same types of devices, or alternatively different types of devices.

Server device 125 may provide any of a variety of data and/or functionality to computing devices 105, 110, 115, and 120. The data may be publicly available or alternatively restricted, e.g., restricted to only certain users or available only if an appropriate fee is paid, etc.

Server device 125 is at least one of a network server and an application server, or a combination of both. Server device 125 is any device that is the source of content, and client devices 105, 110, 115, and 120 include any devices that receive such content. Therefore, in a peer-to-peer network, the device that is the source of the content is referred to as the server device and the device that receives the content is referred to as the client device. Both types of devices are able to load and run software programs, including operating systems and applications, in accordance with the example embodiments described herein. Further, data and functionality may be shared among client devices 105, 110, 115, and 120. That is, service device 125 is not the only source of data and/or functionality for the respective client devices.

At data source 130 or 135, software programs, including operating systems and applications, are prepared for and/or provided to any one of server device 125 or client devices 105, 110, 115, and 120 for execution. For the sake of consistency, the discussion hereafter refers to "applications" which encompass anyone of, at least, software programs, operating systems, and applications, either singularly or in combination, as known in the art. Furthermore, the applications are disseminated to server device 125 either off-line as from data source 130, or on-line as from data source 135. Further still, the applications are typically disseminated to client devices 105, 110, 115, and 120 on-line from server device 125 or from data source 135. Means and methods for off-line dissemination thereof are known as well.

In accordance with various embodiments described below, the dissemination of at least one of data and functionality both in and among devices 105, 110, 115, 120, and 125 may be implemented as a transaction. More particularly, a transaction is a group of operations that are executed synchronously or asynchronously as a single atomic operation, either within one of devices 105, 110, 115, 120 and 125 or in a network environment, such as the example of FIG. 1. An example of transacted remote file operations performed over the network is described in more detail below in conjunction with FIGS. 2–7.

Transacted Remote File Operation

Figure 2:
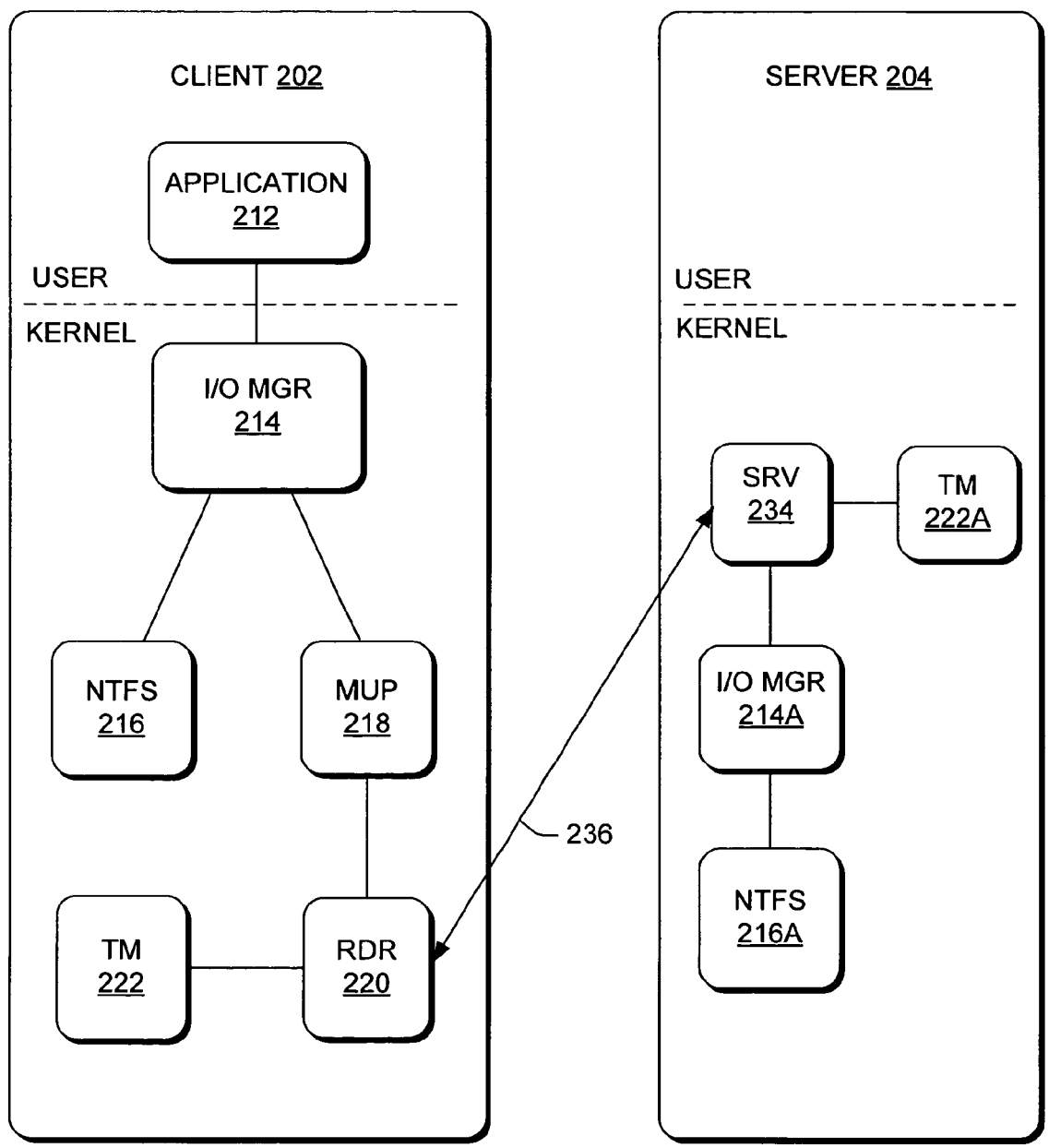
FIG. 2 shows an example of components of a client and a server of the system of FIG. 1.

FIG. 2 illustrates components of two devices of system 100 (e.g., selected from devices 105, 110, 115, 120 and 125) of FIG. 1 that are operating as a client 202 and a server 204 for purposes of a transacted remote file operation. In this embodiment, both client 202 and server 204 use a version of The Microsoft® Windows® operating system. In other embodiments, different operating systems may be used.

In this embodiment, client 202 includes an application 212, an input/output (I/O) manager 214, a file system (FS) 216, a redirector selector 218, a transaction manager (TM) 222, and a redirector (RDR) 220. Server 204, in this embodiment, includes a server component (SRV) 234, an I/O manager 214A, a FS 216A and a TM 222A. In this embodiment, client 202 and server 204 can communicate with each other via network 100 (FIG. 1). In some embodiments, these components are implemented in software.

In this "Windows" embodiment, I/O managers 214 and 214A, FSs 216 and 216A are implemented by the NT file system (NTFS), and redirector selector 218 is implemented by multiple UNC provider (MUP), where UNC is an acronym for Uniform Naming Convention. Thus, redirector selector 218 is also referred to herein as MUP 218. In addition, The Microsoft® Windows® operating system RDR and SRV (with added functionality) implement RDR 220 and SRV 234, respectively. Exemplary additions to The Microsoft® Windows® operating system's RDR and SRV are described below. Still further, in this embodiment, TM 222 and TM 222A are implemented as kernel level transaction managers in this example embodiment, and are described below in more detail. Other embodiments may use different I/O managers, file systems, redirector selectors, TMs and/or RDRs.

Figure 3:
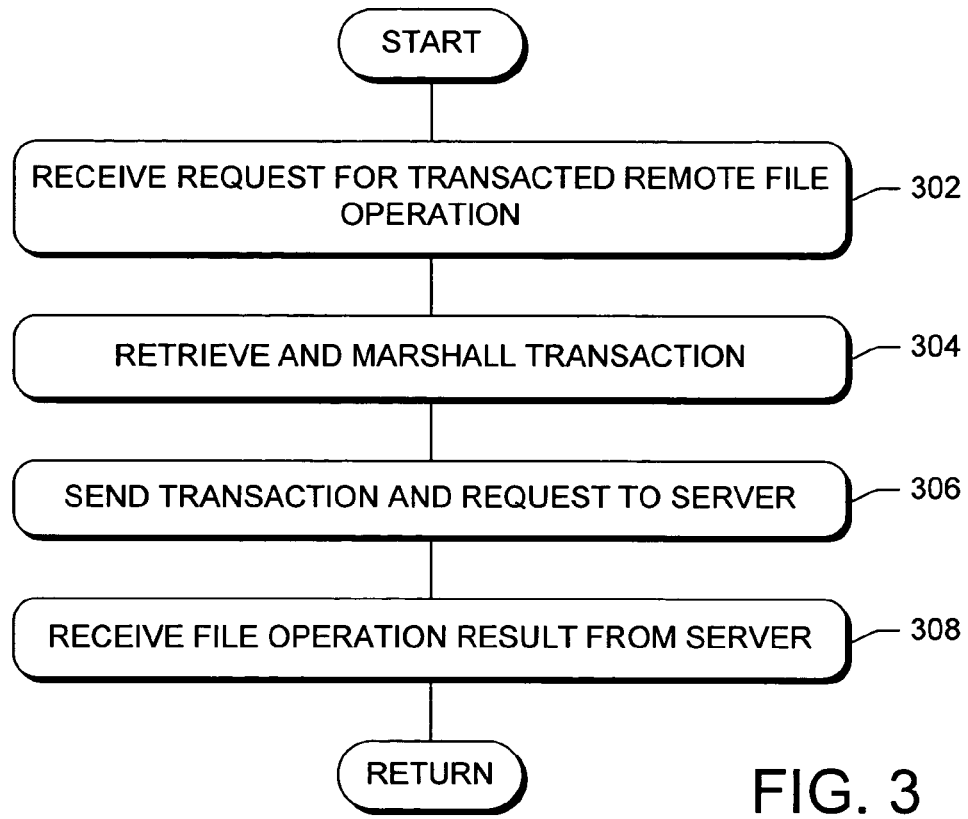
FIGS. 3 and 3A show example processing flows for a transacted remote file operation between the client and server of FIG. 2.

FIG. 3 illustrates an example processing flow for a transacted remote file operation between client 202 and server 204 (FIG. 2). Referring to FIGS. 2 and 3, a transacted remote file operation is performed as follows, according to one embodiment.

In a block 302, RDR 220 receives a request for transacted file operation on a file residing in server 204. Typical file operations include creating a new file, reading a file, writing a file, copying a file, renaming a file, etc. In this embodiment, the request for a transacted file operation is generated by application 212, which is a user level application as shown in FIG. 2. The request uses a structure that includes a field for the transaction context. The request is received by I/O manager 214, which determines whether the request is for a local file or for a remote file. In this embodiment, I/O manager 214 is a standard component of The Microsoft® Windows® operating system. For example, application 212 can make the request via a call to I/O manager 214 with the UNC name (which is in the form of \\server\share\subdirectory\filename). I/O manager 214 then passes the request to MUP 218. There may be multiple handles for a transaction, and multiple transactions for a given file. On the other hand, if the request were for a file on the client, I/O manager 214 would pass the request to NTFS 216 in the standard manner.

MUP 218 then locates the redirector needed to perform the request. In this case, the redirector is RDR 220. In this embodiment, MUP 218 is a standard component of The Microsoft® Windows® operating system. In this embodiment, RDR 220 is a version of the Microsoft® Windows® operating system RDR, with additions so the RDR can interact with TM 222 to perform transactions. The additions include, for example, the capability to retrieve transaction contexts for transacted file operations from requests, assign FCBs for transacted file operations, send transactions to remote devices over the network, receive replies for the transacted file operations (including File identifiers and version identifiers), perform transaction operations under the direction of TM 222, and enlist as a resource manager with TM 222 so that RDR 220 can keep informed regarding the status of a transaction. In some embodiments, RDR 220 is implemented as described in co-pending and commonly assigned U.S. patent application Ser. No. 09/539,233 filed Mar. 30, 2000 entitled "Transactional File System" and application Ser. No. 10/692,261. Enlisting as resource manager is described below. RDR 220 contains resources for buffering the transaction, cache map, file control blocks (FCBs), file object extensions (FOBXs), and other structures needed to process the transaction and request.

In a block 304, RDR 220 retrieves the transaction from TM 222 and marshalls the transaction for transmission to client 204. In one embodiment, RDR 220 retrieves the transaction by calling an API (embodiments of which are described below) exposed by TM 222, and marshalls the transaction by formatting the transaction information (e.g., a marshall blob) for transmission using a version of the SMB protocol that has been extended to support transactions. The SMB extensions of one exemplary embodiment are summarized below in conjunction with Tables 1–3. In a block 306, RDR 220 sends the transaction and the request to server 204, as indicated by an arrow 236. In a block 308, RDR 220 receives results from the file operation from server 204. For example, server 204 sends a response to the request that contains the aforementioned file and version identifiers. In this embodiment, SRV 234 is a version of the Microsoft® Windows® operating system SRV, with additions so the SRV can interact with a client over a network to perform transactions using extension to SMB, including passing File and version identifiers to clients during transacted remote file operations.

TABLE 1

| EXTENSION | DESCRIPTION |
| --- | --- |
| Add a new command:<br>NT_TRANSACT_CREATE2 | Takes a marshalled transaction and sends two structures over the network:<br>REQ_CREATE_WITH_EXTRA_OPTIONS<br>RESP_CREATE_WITH_EXTRA_OPTIONS.<br>These two structures are defined in Tables 2 and 3, respectively, and are extensions of SMB structures:<br>REQ_CREATE_WITH_SD_OR_EA and<br>RESP_EXTENDED_CREATE_WITH_SD_OR_EA |
| Add a new capability bit:<br>CAP_TXF | CAP_TXF is set or reset by the server to indicate whether the server supports transactions. CAP_TXF is part of the SMB Negotiate Response. In this embodiment, CAP_TXF is defined as 0x20000 to indicate the server supports transactions |
| Add a new flag:<br>SMB_FIND_TRANSACTED_OPERATION to the SMB FIND request. The FIND request (REQ_FIND_FIRST2) structure is defined in Table 4 and the response structure in Table 5. | SMB_FIND_TRANSACTED_OPERATION indicates that a transaction is being used. This flag is used because in this embodiment, find operations are path based instead of handle based. In this embodiment, this flag is defined as 0x20. Transaction information is sent at the end of FIND and ECHO commands if this flag is set. |
| Extend the ECHO command to send notifications of transaction state changes. The request/resp structures are defined in Table 6 and 7. | The SMB ECHO command is extended to provide notification of the pre-prepare, prepare, commit, rollback states of a transaction operation from the server to the client. . |

TABLE 2

REQ_CREATE_WITH_EXTRA_OPTIONS

| FIELD | CONTENT DESCRIPTION |
| --- | --- |
| _ULONG( Flags ) | Creation flags NT_CREATE_xxx |
| _ULONG( RootDirectoryFid ) | Optional directory for relative open |
| ACCESS_MASK DesiredAccess | Desired access (NT format) |
| LARGE_INTEGER AllocationSize | The initial allocation size in bytes |
| _ULONG( FileAttributes ) | The file attributes |
| _ULONG( ShareAccess ) | The share access |
| _ULONG( CreateDisposition ) | Action to take if file exists or not |
| _ULONG( CreateOptions ) | Options for creating a new file |
| _ULONG( SecurityDescriptorLength ) | Length of SD in bytes |
| _ULONG( EaLength ) | Length of extended attribute (EA) in bytes |
| _ULONG( NameLength ) | Length of name in characters |
| _ULONG( ImpersonationLevel ) | Security Quality of Service (QOS) information |
| _UCHAR SecurityFlags | Security QOS information |
| _ULONG( TransactionLength ) | Length of marshalled transaction context in bytes. |
| _ULONG( EfsStreamLength ) | Length of encrypted file system ($EFS) stream in bytes. |
| UCHAR Buffer[1] | Buffer for the file name, which is aligned in the data buffer to a DWORD (4 bytes) boundary |
| UCHAR Name[ ] | The name of the file (not NUL terminated) |

TABLE 3

RESP_CREATE_WITH_EXTRA_OPTIONS

| FIELD | CONTENT DESCRIPTION |
|---|---|
| UCHAR OplockLevel | The opportunistic lock level granted |
| UCHAR ExtendedResponse | Set to 1 for Extended response |
| _USHORT( Fid ) | The file ID |
| _ULONG( CreateAction ) | The action taken |
| _ULONG( EaErrorOffset ) | Offset of the EA error |
| TIME CreationTime | The time the file was created |
| TIME LastAccessTime | The time the file was accessed |
| TIME LastWriteTime | The time the file was last written |
| TIME ChangeTime | The time the file was last changed |
| _ULONG( FileAttributes ) | The file attributes |
| LARGE_INTEGER AllocationSize | The number of byes allocated |
| LARGE_INTEGER EndOfFile | The end of file offset |
| _USHORT( FileType ) | The file type of the file |
| _USHORT( DeviceState ) | The state of IPC device (e.g., pipe) |
| BOOLEAN Directory | TRUE if this structure is a directory |
| UCHAR VolumeGuid[16] | The volume GUID (Globally Unique ID) |
| UCHAR FileId[8] | The file ID |
| _ULONG( MaximalAccessRights ) | The access rights for the session owner |
| _ULONG(GuestMaximalAccessRights) | The maximal access rights for guest |
| LARGE_INTEGER FilesystemFid; | The NTFS Fid on the server, to differentiate between different files having the same pathname. Same pathname could refer to two different files while using transactions (TxF). |
| _ULONG( VersionNum ); | The TxF version # of the file that is opened |

TABLE 4

REQ_FIND_FIRST2

| FIELD | CONTENT DESCRIPTION |
|---|---|
| _USHORT( SearchAttributes ) | Search attributes |
| _USHORT( SearchCount ) | Maximum number of entries to return |
| _USHORT( Flags ) | Additional information: bit set<br>0 - close search after this request<br>1 - close search if end reached<br>2 - return resume keys |
| _USHORT( InformationLevel ) | Information Level |
| _ULONG(SearchStorageType) | Search Storage Type |
| UCHAR Buffer[1] | File name |

TABLE 5

RSP_FIND_FIRST2

| FIELD | CONTENT DESCRIPTION |
|---|---|
| _USHORT( Sid ) | Search handle |
| _USHORT( SearchCount ) | Number of entries returned |
| _USHORT( EndOfSearch ) | Was last entry returned? |
| _USHORT( EaErrorOffset ) | Offset into EA list if EA error |
| _ULONG(SearchStorageType) | Search Storage Type |
| _USHORT( LastNameOffset ) | Offset into data to file name of last entry, if server needs it to resume search; else 0 |

TABLE 6

REQ_ECHO

| FIELD | CONTENT DESCRIPTION |
|---|---|
| UCHAR WordCount | Count of parameter words = 1 |
| _USHORT( SearchCount ) | Number of entries returned |
| _USHORT( EndOfSearch ) | Was last entry returned? |
| _USHORT( EaErrorOffset ) | Offset into EA list if EAerror |
| _USHORT( LastNameOffset ) | Offset into data to file name of last entry, if server needs it to resume search; else 0 |

TABLE 7

RSP_ECHO

| FIELD | CONTENT DESCRIPTION |
|---|---|
| UCHAR WordCount | Count of parameter words = 1 |
| _USHORT( SequenceNumber ) | Sequence number of this echo |
| _USHORT( ByteCount ) | Count of data bytes; min = 4 |
| UCHAR Buffer[1] | Echoed data |

Figure 3A:
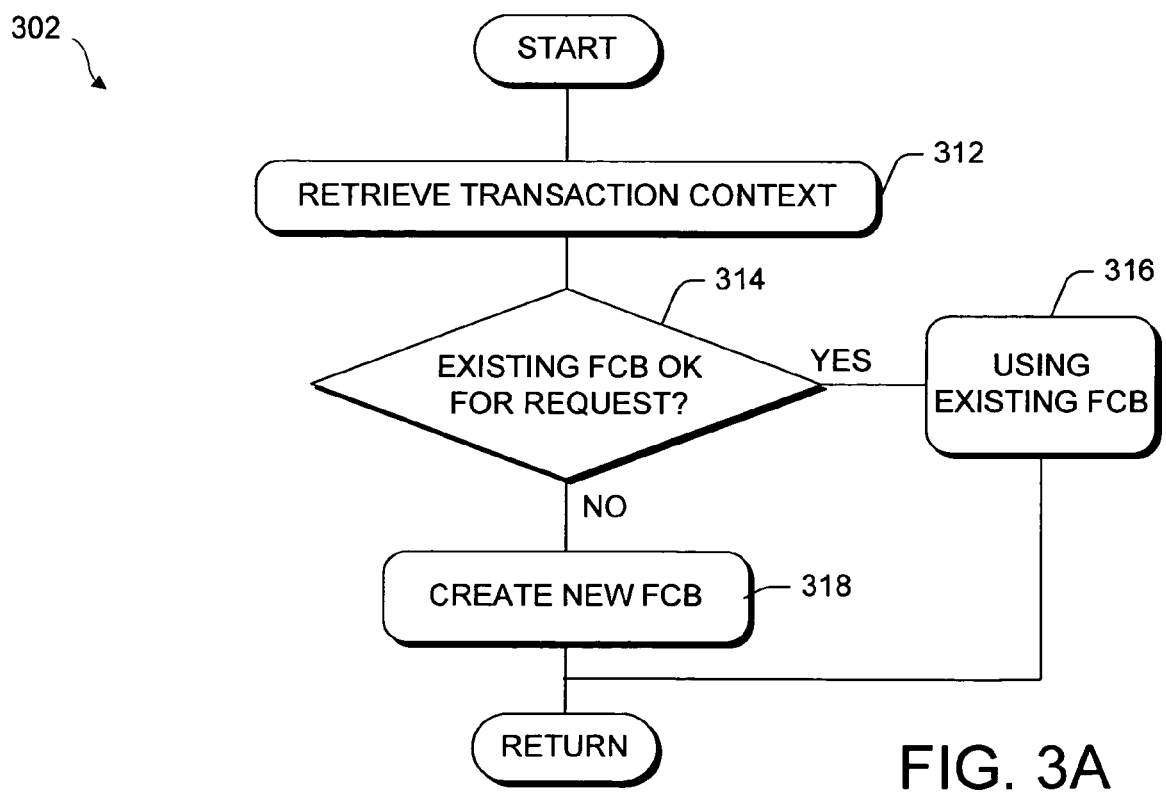

FIG. 3A shows block 302 (FIG. 3) in more detail, according to one embodiment. In a block 312, RDR 220 retrieves the transaction context for the requested file operation. In opening a transacted remote file, RDR 220 determines whether a transaction is already associated with the request. For example, in one embodiment, a transaction is associated with a request by attaching it to a thread, but in other embodiments different methods may be used to associate a transaction to a request. In one embodiment, RDR 220 performs this operation by checking to see if the request has a transaction handle associated with it. If so, the request is joined to the existing transaction. If not, RDR 220 handles the request in the standard manner for non-transacted requests.

RDR 220 then assigns an FCB to the request. As previously mentioned, multiple transactions with multiple requests may open a given file. Thus, in one embodiment of block 302 (FIG. 3), a block 314 is performed in which RDR 220 determines whether an existing FCB can be used for the request. In this embodiment, RDR 220 checks to see if the file (i.e., pathname) of the request and the transaction context associated with the thread making the request match those of an existing FCB. For example, if two write operations of the same file were requested in the same transaction, during processing of the second request, an FCB would already exist for the first request. Because both operations are write operations, the same FCB can be used for both.

If in block 314 RDR 220 determines that a FCB exists with the same transaction context and same file (i.e., pathname) and the same version, then in a block 316 the existing FCB is used for the request. In some embodiments, RDR 220 will use the FCB that has the most recent version. For example, if a read operation of a file follows an uncommitted write operation of the same file, RDR 220 will use the version of the file currently being used by the write operation. This approach allows for more efficient use of caching.

However, if in block 314 an existing FCB cannot be used for the request, in a block 318 RDR creates a new FCB for the request. In an alternative embodiment, a new FCB is created for each request.

FIG. 4 illustrates an example of multiple uncommitted transacted requests for the same file. As shown in FIG. 4, an operation 401 corresponds to a request for a read operation of a file. That is, the file operation is to "open for read". Operation 401 has a handle H1 and a transaction T1 associated with it. The version of the file that is requested by RDR 220 (FIG. 2) is denoted as version A. Assuming this is the first uncommitted transaction for this file, version A is retrieved from server 204 (FIG. 2) and cached in client 202 (FIG. 2).

At a later time, an operation 402 is requested on the same file. In this example operation 402 is also a read operation, having a handle H2 and a transaction T2. Because the transaction is different from that of operation 401, RDR 220 again retrieves version A of the file from server 204.

In this example, an operation 403 is then requested on the same file in the same transaction as operation 402. Thus, operation 403 has a handle H3 and is joined to transaction T2. However, operation 403 is a write operation in this example, and thus, RDR 220 locally remembers (e.g., caches) a version B of the file. Version B is sometimes referred to as a "dirty version".

An operation 404 is then requested on the same file in the same transaction as operations 402 and 403. Thus, operation 404 has a handle H4 and is also joined to transaction T2. In this example, operation 404 is a read operation. In this embodiment, resulting from block 314 (FIG. 3A), RDR 220 will remember and possible cache version B for operation 404.

An operation 405 is then requested on the same file in a different transaction. Thus, operation 405 has a handle H5 and is associated with a new transaction T3. Because the transaction is different from that of the previous operations, in one embodiment RDR 220 again retrieves version A of the file from server 204. In another embodiment, RDR 229 recognizes that version A is still the current version without consulting server 204 (FIG. 2), and uses the "local" version A. For example, this alternative embodiment can use opportunistic locks to become aware of any newer versions of the file that reside in server 204. That is, RDR 220 may associate an opportunistic lock with the file that does not prevent writes to the file on server 204, but does cause server 204 to signal RDR 220 that the lock was broken. In such a case, RDR 200 would then know that version A is no longer the current version. In yet another embodiment, RDR 220 may consult server 204 to determine the current version of the file, and then reuse an existing FCB that is associated with the current version.

Then in an operation 406, transaction T2 is committed. This has the effect of changing the version on server 204. This new version stored on server 204 is denoted as version C. As was previously described, because RDR 220 enlists as a resource manager during all remote transactions, RDR 220 learns that sever 204 has a new version of the file.

An operation 407 is then requested on the same file in the same transaction as operation 401. Thus, operation 407 has a handle H6 and is joined to transaction T1. However, because RDR 220 is aware of version C of the file on server 204, RDR 220 remembers and possibly caches version C for this operation. In some embodiments, RDR 220 retrieves version C from server 204.

Similarly, when an operation 408 is requested for the same file by the same transaction as operation 405, operation 408 has a handle H7 and is joined to transaction T3. Again, because RDR 220 is aware of version C of the file on server 204, RDR 220 remembers and possibly caches version C for this operation.

Figure 5:
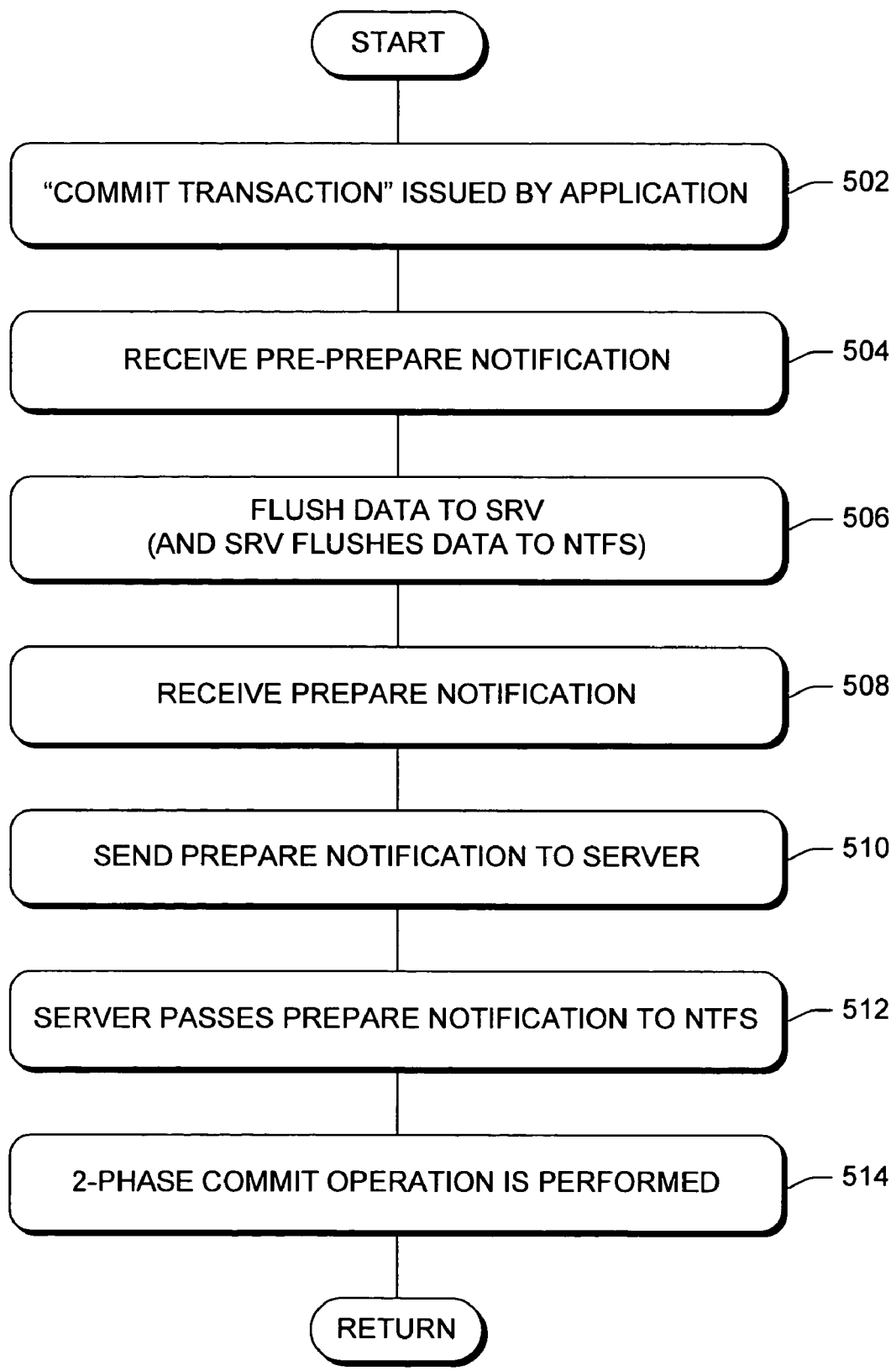
FIG. 5 shows an example processing flow for performing a two-phase commit of a transaction over a network.

FIG. 5 illustrates how cached data from client 202 (FIG. 2) is flushed to (i.e., durably stored in) server 204 (FIG. 2), according to one embodiment. Referring to FIGS. 2 and 5, client 202 flushes data to server 204 as described below, according to one embodiment.

In a block 502, the application generating the data makes a call or issues a request to commit the transaction. This call or request is passed to TM 222. In response, TM 222 generates a Pre-prepare Notification (described below in conjunction with the Example Transaction Manager).

In this embodiment, RDR 220 receives the Pre-Prepare Notification from TM 222, as shown in a block 504. In response, RDR 220 flushes the data to SRV 234 via the network. SRV 234 in turn passes the data to NTFS 216A. These operations are represented by a block 506. In some embodiments, TM 222A of server 204 signals RDR 220 when the Pre-Prepare operation is complete. Block 504 and 506 help ensure that the data from client 202 to be written on server 204 is present on server 204 before a Prepare operation (described below in conjunction with the Example Transaction Manager) is performed.

In a block 508, RDR 220 receives a Prepare Notification (described below in conjunction with the Example Transaction Manager) from TM 222. In one embodiment, RDR 220 sends a Prepare Notification message to server 204 in response to the Prepare Notification, which is passed on to TM 222A. In turn, TM 222A passes the Prepare Notification to NTFS 216A. These operations are represented by blocks 510 and 512. The Prepare Notification causes client 202 and server 204 to store the data in a manner that allows the data to be either committed or rolled-back. In some embodiments, TM 222A of server 204 signals RDR 220 when the Prepare operation is complete. The data is then processed using standard two-phase commit operations (e.g., operations that cause the transaction to be committed or aborted), as represented by a block 514.

Although transaction management is described above as being performed using separate TM components (i.e., TM 222 and 222A), in other embodiments the transaction management infrastructure may be integrated into the file system infrastructure. Further, in such integrated embodiments, the transaction messages (e.g, PrePrepare, Prepare, Commit, Abort, etc. as described below) flow with the file messages on the transmission channel.

Example Transaction Manager

Figure 6:
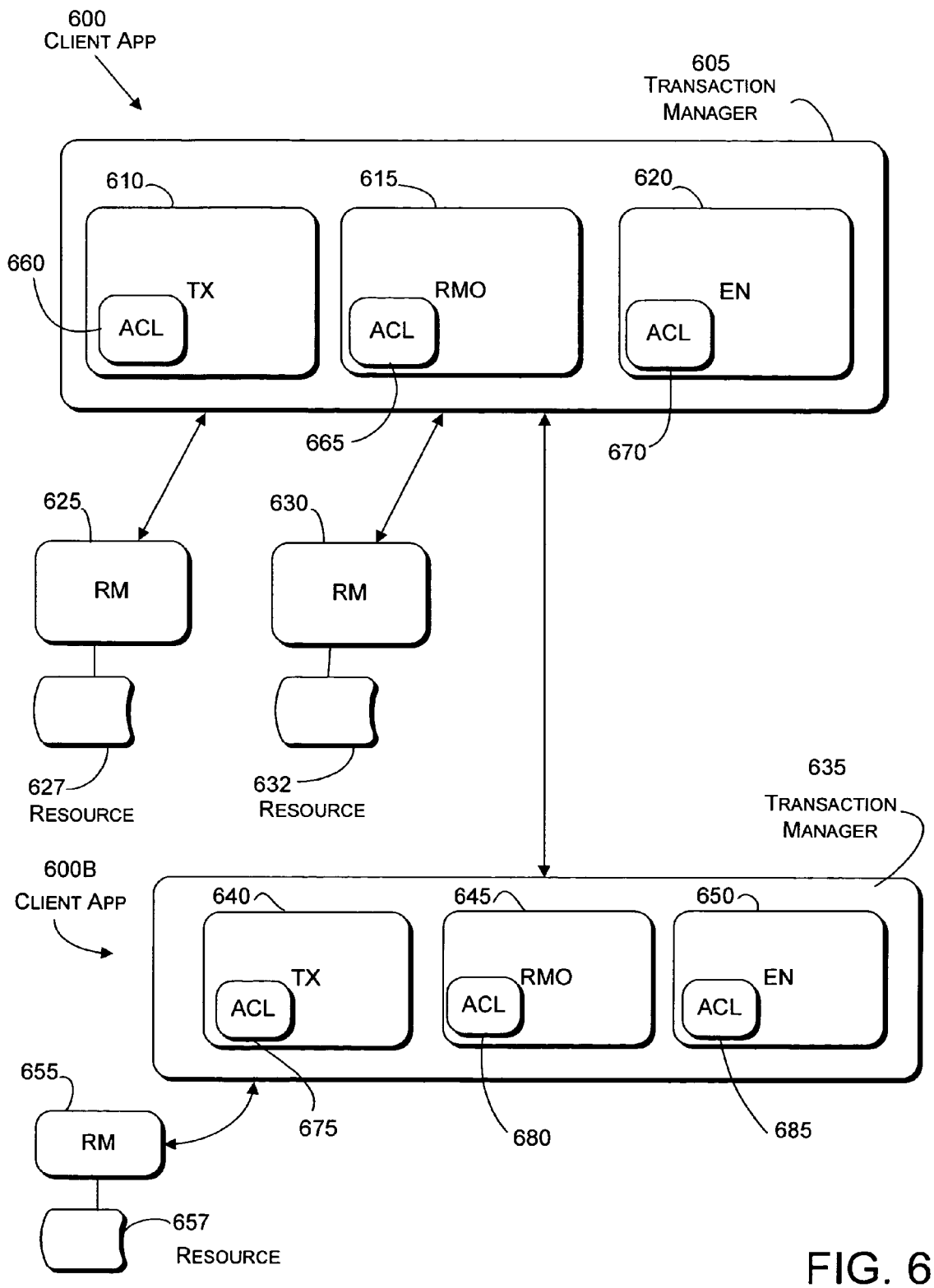
FIG. 6 shows an example of components for implementing transaction management.

FIG. 6 illustrates components used in performing a transaction, according to one embodiment. A group of operations that make up a particular transaction is to collectively have properties known, at least to those in the art, by the acronym "ACID," which includes "atomicity," "consistency," "isolation," and "durability." More specifically: data updates resulting from the respective operations of a transaction are either all permanent or none are permanent (atomicity); a transaction leaves underlying data in a consistent state (consistency); the effects of a transaction update are not visible to other concurrently-running operations until the overall transaction is made permanent (isolation); and after an outcome for a transaction has been determined, the result is guaranteed never to change (durability).

The kernel-level transaction management example of FIG. 6 is directed towards an example of a distributed transaction, involving more than one device, and maintains the "ACID" characteristics expected of a transaction. Further, whereas the example of FIG. 6 references kernel objects, the example is in no way limited to transactions implemented by kernel objects. More specifically, transactions, described herein, may be implemented by objects other than kernel objects, or by a different type of transaction manager.

In FIG. 6, a transaction corresponding to client application 600 utilizes, at least, transaction manager 605 on a first device, as well as client application 600B and transaction manager 635 on a second device. Client application 600B is associated with client application 600. Transaction managers 605 and 635, which are in communication with each other, may be aggregates of kernel objects that maintain state information about overall transactions and resources, and further coordinate interaction or protocol between client applications and associated resources managers (RM).

Resource managers, including RM625 and RM 630 in the example of FIG. 6, maintain the state of at least one underlying resource that is capable of storing data in a durable state. Non-exclusive examples of such resources include databases and message queues. In a first device in the example embodiment of FIG. 6, RM 625 corresponds to resource 627; RM 630 corresponds to resource 632; and in a second device, RM 655 corresponds to resource 657.

As shown in FIG. 6, transaction manager 605 on a first device includes the following kernel objects: transaction object (TX) 610, resource manager object (RMO) 615, and enlistment object (EN) 620; and transaction manager 635 on a second device includes the following kernel objects: TX 640, RMO 645, and EN 650. TX represents a particular transaction, and may be opened by a process participating in the transaction.

RMO represents a resource that participates in a particular transaction. Participation by RMO in a transaction includes receiving two-phase commit messages. Further, RMO is persistent so that the corresponding transaction manager knows which transaction outcome is to be transmitted to a corresponding RM. Alternatively, RMO may be transient thus enabling client applications to subscribe to a stream of transaction notifications without managing a persistent RMO across failures.

EN represents the relationship between a transaction and a resource manager. A resource manager indicates that it will participate in a transaction by creating an enlistment on it. When RMO has been requested to perform an operation (such as Prepare, Commit, etc.) on a particular transaction, it uses EN to indicate participation. A resource manager can have more than one EN on a particular Transaction.

Figure 7:
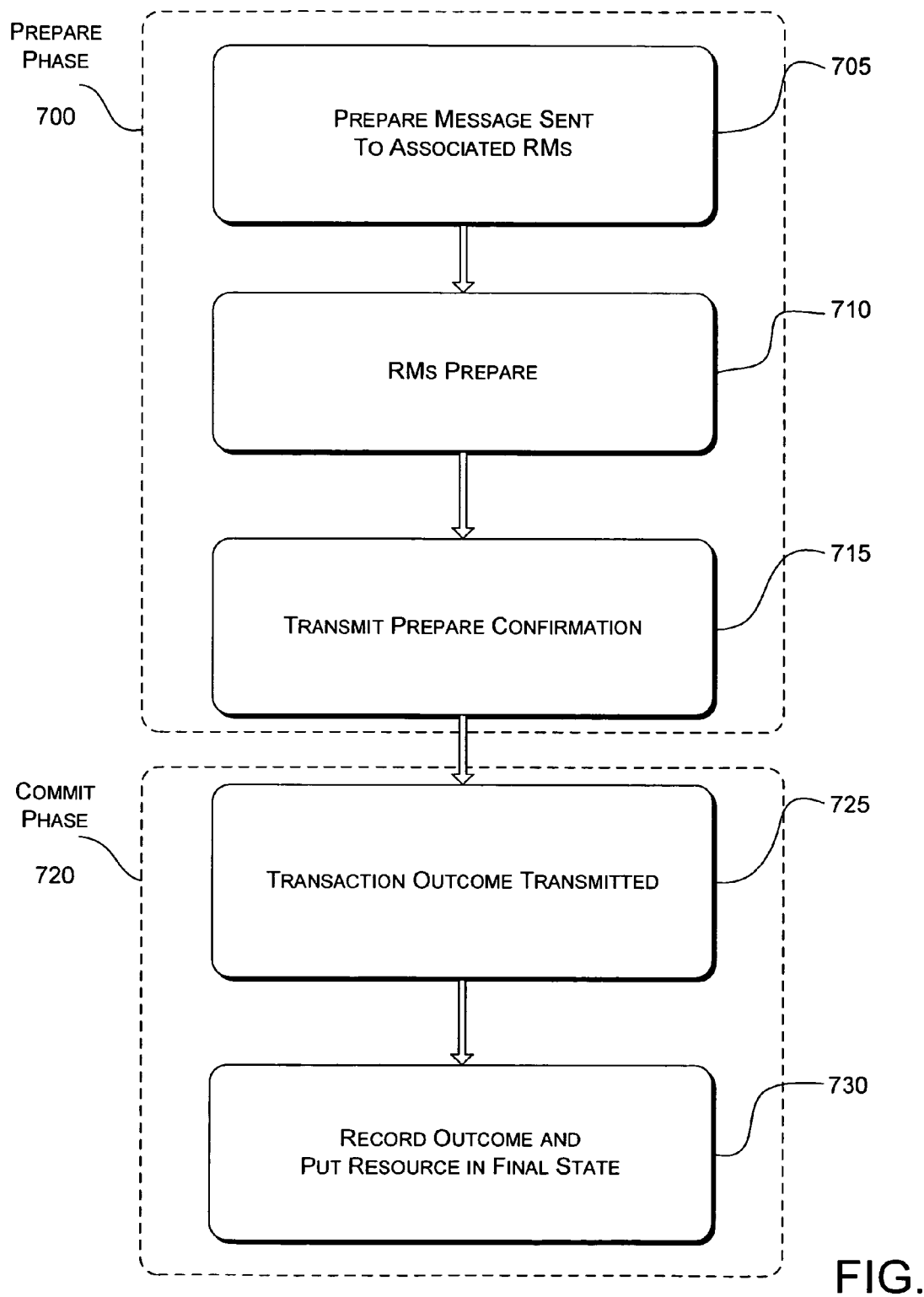
FIG. 7 shows an example processing flow for kernel-level transactions.

Two-phase commit protocol, which is implemented to ensure that a transaction successfully updates all appropriate files, is described for a kernel environment with reference to the examples of FIGS. 6 and 7, as follows. In particular, after client application 600 opens kernel objects corresponding to transaction manager 605 on a first device and SRV 234 (FIG. 2) opens kernel objects corresponding to transaction manager 635 on a second device, a "prepare" phase 705 commences with each RM in the transaction being sent 705 a "prepare" order from a corresponding transaction manager. Thus alerted, RM prepares 710 by rendering resource data in a durable state so that the data in the respective resources is capable of being "committed" or "rolled back." Upon preparing, RM transmits 715 a confirmation message to TX of the corresponding transaction manager.

The "commit" phase 720 is performed upon a resolution of the transaction, whereby TX of the transaction manager transmits 725 a transaction outcome of either "committed" or "abort/rolled back" to each associated RM. RM then records the outcome in an associated log, and the underlying resource data is either committed or rolled back, in accordance with the transaction outcome. Alternative embodiments may allow for volatile enlistments for which the data for the transaction is not durable, and therefore the data is not logged or recovered.

Transaction management on the kernel level may be implemented by utilizing application program interfaces (API) that are applicable to system architectures including, but not limited to, The Microsoft® Win32® application programming interface and The Microsoft® Windows® operating system. The APIs described herein are exposed via a handle-based interface, a "handle" referencing the API-intended object. Further, unless asynchronous operation is explicitly requested, operations on the respective kernel objects, particularly TX and RMO, are synchronous. Further still, the operations corresponding to different embodiments of a transaction may be implemented by various combinations of one or more of the APIs described herein. That is, some embodiments may use all of the APIs described herein, while other embodiments may use various combinations thereof.

APIs to implement operations on TX kernel objects, and a corresponding description of the functionality of the API, are provided below (more detailed descriptions of the associated routines are provided even further below):

PreprepareEnlistment: also known as "Phase 0" processing, requests that TX transmit a pre-prepare message to all associated RMs;

PrepareEnlistment: requests that TX transmit a prepare request to all enlisted RMs.

CreateTransaction: opens a new TX;

OpenTransaction: opens an existing TX;

CommitTransaction: requests that TX be committed;

RollbackTransaction: requests that TX abort or rollback the transaction;

SavepointTransaction: requests that TX save the state of the transaction;

GetTransactionInfo: retrieve information about the TX; and

SetTransactionInfo: sets information about the TX.

APIs utilized to implement operations on RMO kernel objects, and a corresponding description of the functionality of the API, are provided below (more detailed descriptions of the associated routines are provided even further below):

CreateResourceManager: create a new RMO that represents a resource;

OpenResourceManager: open an existing RMO;

DestroyResourceManager: destroy RMO, thus rendering it non-persistent;

GetResourceManagerInfo: retrieve information about RMO;

SetResourceManagerInfo: set information about RMO;

CreateEnlistment: causes RMO to join a transaction, and retrieves related notifications; and GetNotificationResourceManager: queries for, and returns, an available RM notification.

APIs utilized to implement operations on TX kernel objects by an RMO kernel object after joining a transaction, and a corresponding description of the functionality of the API, are provided below (more detailed descriptions of the associated routines are provided even further below):

PrePrepareComplete: indicates that RM has completed pre-preparing as requested by a corresponding transaction manager;

PrepareComplete: indicates that RM has completed preparing a transaction as requested by the corresponding transaction manager;

RollbackComplete: indicates that RM has completed rolling back the transaction work performed as requested by the corresponding transaction manager; and CommitComplete: indicates that RM has completed committing the transaction work as requested by the corresponding transaction manager.

Unfortunately, APIs associated with kernel objects TX, RMO, and EN utilized to implement transaction management may expose one or more of the kernel objects to various security attacks. For instance, a malicious or invalid RM may enlist itself into a transaction to cause denial-of-service attacks by never responding to function calls or, alternatively, force transaction aborts. Therefore, a further illustrative example, also referring to FIG. 6, is directed towards secure, kernel-level, distributed transaction.

The example embodiment of FIG. 6 further provides a security solution for vulnerable kernel objects by applying a security descriptor, which may include an access control list (ACL), to at least one of the respective kernel objects.

In a first device ACL 660 is applied to TX 610, ACL 665 is applied to RMO 615, and ACL 670 is applied to EN 620. In a second device, ACL 675 is applied to TX 640, ACL 680 is applied to RMO 645, and ACL 685 is applied to EN 650.

An ACL defines the "rights" that a particular user or user group is allowed or denied to exercise over a particular object. More specifically, as shown in the example ACL 810 of FIG. 8, an ACL that is applied or attached to a kernel object includes at least access control entry (ACE) that comprises a corresponding security identifier (SID) and a corresponding set of rights. ACE entries 1–12 in FIG. 8 include, respectively, corresponding SIDs 1–12 and corresponding RIGHTs 1–12.

SIDs 1–12 identify either a user or a user group that may attempt to implement an operation, or a series of operations, on the kernel object to which the ACL is applied. RIGHTs 1–12 specify an operation or series of operations capable of being performed on the respective kernel object by the user or user group identified by the SID, and further specify the accessibility of such operation or operations to the identified user or user group. That is, RIGHTs 1–12 may indicate either that the identified user or user group is permitted to perform a specified operation, or that the identified user or user group is prohibited to perform a specified operation.

The following is a list of example operations that may be specified by RIGHTs 1–12 in an ACL applied to TX, followed by a description of the functionality of the operation. RIGHTs 1–12 further specify that the operation is permitted or denied on TX to the user or user group identified by the corresponding SID.

TRANSACTION_QUERY_INFORMATION: to get information about TX;

TRANSACTION_SET_INFORMATION: to set information about TX;

TRANSACTION_ENLIST: to enlist on TX in the transaction;

TRANSACTION_COMMIT: to render all data updates associated with TX durable;

TRANSACTION_ROLLBACK: to abort, i.e., rollback the operation on TX;

TRANSACTION_PROPOGATE: to transmit data from TX to another object;

TRANSACTION_SAVEPOINT: to save the current point of the transaction; and

TRANSACTION_MARSHAL: to transmit data regarding the transaction to another device.

The following is a list of example operations that may be specified by RIGHTs 1–12 in an ACL applied to RMO, followed by a description of the functionality of the operation. RIGHTs 1–12 further specify that the operation is permitted or denied on RMO to the user or user group identified by the corresponding SID.

RESOURCEMANAGER_QUERY_INFORMATION: to get information about RMO;

RESOURCEMANAGER_SET_INFORMATION: to set information about RMO;

RESOURCEMANAGER_RECOVER: to determine the state of a transaction at moment of transaction failure;

RESOURCEMANAGER_ENLIST: to enlist RMO in a transaction;

RESOURCEMANAGER_GET_NOTIFICATION: to receive notification upon resolution of transaction from transaction manager;

RESOURCEMANAGER_REGISTER_PROTOCOL: to register a protocol that RMO supports in the transaction; and RESOURCEMANAGER_COMPLETE_PROPOGATION: to set resource in accordance with transaction resolution.

The following is a list of example operations that may be specified by RIGHTs 1–12 in an ACL applied to EN, followed by a description of the functionality of the operation. RIGHTs 1–12 further specify that the operation is permitted or denied on EN to the user or user group identified by the corresponding SID.

ENLISTMENT_QUERY_INFORMATION: to get information about EN;

ENLISTMENT_SET_INFORMATION: to set information about EN;

ENLISTMENT_RECOVER: to determine state of enlistments at moment of transaction failure;

ENLISTMENT_REFERENCE: to obtain and reference (or dereference) an enlistment key;

ENLISTMENT_SUBORDINATE_RIGHTS: to rollback the transaction and to respond to notifications; and ENLISTMENT_SUPERIOR_RIGHTS: to perform operations a superior transaction manager would perform; such as initiate a preprepare, prepare, or superior rollback operation in a transaction.

Accordingly, each of kernel objects TX, RMO, and EN may have an ACL respectively applied thereto. Thus, when an API attempts to initiate an operation on a respective one of the kernel objects, the ACL must be honored by determining whether the operation is permitted or denied to the user or user group from which the API originates.

More specifically, when a handle is opened for performing an operation, a user or user group corresponding to the API is checked against the SID in the ACL; a list of allowed operations is generated; and the operation specified by the API is checked against the allowed operations for the SID on a given handle.

Alternative embodiments for securing transaction management among kernel objects, and enforcing security parameters, includes applying security descriptors to kernel objects that may participate in a transaction in accordance with the security model for The Microsoft® Windows® operating system.

As set forth above, the APIs are exposed as a handle-based interface, which is utilized to implement the security model. The following includes a more detailed description of the APIs, listed above, to implement operations on TX kernel objects. The descriptions include a description of the routine, corresponding arguments, and return values.

PreprepareEnlistment

| (IN | PHANDLE | TransactionHandle; |
| IN | PHANDLE | ResourceManagerHandle). |

This routine requests that a Transaction be "pre-prepared" by issuing a Pre-Prepare request to all associated RMs. PrePrepare allows an RM with cache-like properties an opportunity to flush its caches, possibly to other RMs, before the Transaction enters the Prepared state, in which down-stream RMs can no longer accept changes.

If this routine is not called and a transaction participant has requested Phase0 processing, PrePrepare requests are issued as requested when a Prepare is received. However, some configurations that include cache-like RMs may cause unnecessary transaction rollbacks in distributed scenarios if there is no PreprepareEnlistment.

Arguments:
TransactionHandle: Supplies a handle indicating the Transaction to be pre-prepared;
ResourceManagerHandle: Supplies a handle to the Superior-TM/CRM that is pre-preparing the transaction. Only this Superior-TM/CRM will be able to call PrepareEnlistment, SuperiorCommitTransaction, and SuperiorRollbackTransaction on this transaction.

Return Value:
STATUS_SUCCESS
STATUS_ACCESS_DENIED
STATUS_INVALID_HANDLE
STATUS_INSUFFICIENT_RESOURCES
STATUS_TM_TOO_LATE
  PrepareEnlistment

| (IN | PHANDLE | TransactionHandle, |
| IN | PHANDLE | ResourceManagerHandle); |

This routine requests that a Transaction be "prepared" by issuing a Prepare request to all of its associated Resource-Managers. This request begins the two-phase commit protocol.

A transaction participant issuing PrepareEnlistment renders the Transaction object into a durable state that will survive system or application crashes; such a participant performs recovery on the transaction after any type of failure in order to deliver an outcome. Failure to fulfill this requirement may result in resource leaks, as well as inconsistent transaction outcomes.

Arguments:
TransactionHandle: Supplies a handle for the Transaction to be prepared; and
ResourceManagerHandle: Supplies a handle to a TM that is preparing the transaction. If the transaction has been pre-prepared (via a call to PreprepareEnlistment), then ResourceManagerHandle matches the Superior-TM/CRM that was used in the call to PreprepareEnlistment. Furthermore, only the Superior-TM/CRM that calls this API will be allowed to call SuperiorCommittransaction and SuperiorRollbackTransaction on this transaction.

Return Value:
STATUS_SUCCESS
STATUS_ACCESS_DENIED
STATUS_INVALID_HANDLE
STATUS_INSUFFICIENT_RESOURCES
STATUS_TM_TOO_LATE
STATUS_RM_NOT_RECOVERABLE
  CreateTransaction

| (OUT PHANDLE | TransactionHandle, | |
| IN ULONG | DesiredAccess | OPTIONAL; |
| IN POBJECT_ATTRIBUTES | ObjectAttributes | OPTIONAL; |
| IN ULONG | CreateOptions | OPTIONAL; |
| IN PHANDLE | ResourceManagerHandle | OPTIONAL; |
| IN NOTIFICATION_MASK | NotificationMask | OPTIONAL; |
| IN LPVOID | TransactionKey | OPTIONAL). |

This routine creates a new Transaction object, and returns a handle to the new object.

Alternatively (if the ResourceManagerHandle parameter is specified), this routine performs a "Join" operation on the Transaction after it is successfully created.

Clients close the transaction handle using the CloseHandle API. If the last transaction handle closes without anyone calling CommitTransaction on the transaction, then the transaction is implicitly rolled back.

Arguments:
TransactionHandle: Supplies a pointer to the location that will receive a handle to the new Transaction;
DesiredAccess: Supplies the mask specifying the desired level of access. The valid access mask choices are:

| SYNCHRONIZE | Can perform synchronization operations on this handle. |
| TRANSACTION_COMMIT | Can use this handle to commit transaction |
| TRANSACTION_PREPARE | Can use this handle to commit transaction |
| TRANSACTION_ROLLBACK | Can use this handle to abort transaction |
| TRANSACTION_SAVEPOINT | Can use this handle to create savepoints for the transaction |
| TRANSACTION_JOIN | Can use this handle to join this transaction as an RM |
| TRANSACTION_READ_ATTRIBUTES | Can read attributes associated with transaction |
| TRANSACTION_WRITE_ATTRIBUTES | Can write attributes associated with transaction; |
| Object Attributes: | Supplies a pointer to an optional object attributes structure; |
| CreateOptions | Supplies optional transaction flags. Valid create flag choices include: |
| TRANSACTION_CREATE_PRESUMED_NOTHING | Creates a "presumed nothing" transaction. |

ResourceManagerHandle: Supplies a handle to the ResourceManager that receives notifications about a specified transaction;

NotificationMask: Specifies the notifications that this ResourceManager would like to receive regarding this Transaction; and TransactionKey: Specifies an opaque pointer value that the RM would like to receive along with any notifications for this Transaction. The RM may use this to associate notifications with some object in the RM's address space, thus obviating the need to perform a lookup each time a notification occurs.

Return Value:
STATUS_SUCCESS
STATUS_INVALID_PARAMETER
STATUS_OBJECT_NAME_COLLISION
STATUS_OBJECT_NAME_INVALID
STATUS_PRIVILEGE_NOT_HELD
STATUS_INSUFFICIENT_RESOURCES
OpenTransaction

```
(OUT  PHANDLE              TransactionHandle,
 IN   ACCESS_MASK          DesiredAccess,
 IN   POBJECT_ATTRIBUTES   ObjectAttributes,
 IN   PHANDLE              ResourceManagerHandle  optional,
 IN   NOTIFICATION_MASK    NotificationMask       optional,
 IN   LPVOID               TransactionKey         optional);
```

This routine looks up an existing Transaction object, and returns a handle to the Transaction. The caller specifies a string representation of a GUID in an ObjectName field of ObjectAttributes.

Alternatively (if the ResourceManagerHandle parameter is specified), this routine also performs a "Join" operation on the Transaction after it is opened.

Clients close the transaction handle using a CloseHandle API. If the last transaction handle closes without anyone calling CommitTransaction on the transaction, then the transaction is implicitly rolled back the transaction.

Arguments:

TransactionHandle: Supplies a pointer to the location that will receive a handle to the Transaction if the open operation succeeds;

DesiredAccess: Supplies the mask specifying the desired level of access;

ObjectAttributes: Supplies a pointer to an optional object attributes structure;

ResourceManagerHandle: Supplies a handle to the ResourceManager that receives notifications about the specified Transaction;

NotificationMask: Specifies notifications that this ResourceManager may receive regarding this Transaction; and TransactionKey: Optionally specifies an opaque pointer value that the RM would like to receive along with any notifications for this Transaction. The RM may use this to associate notifications with some object in the RM's address space, thus obviating the need to perform a lookup each time a notification occurs.

Return Value:
STATUS_SUCCESS
STATUS_INVALID_PARAMETER
STATUS_OBJECT_NAME_INVALID
STATUS_OBJECT_NAME_NOT_FOUND
STATUS_OBJECT_PATH_SYNTAX_BAD
STATUS_PRIVILEGE_NOT_HELD
STATUS_INSUFFICIENT_RESOURCES CommitTransaction

```
(IN PHANDLE   TransactionHandle
 IN ULONG     CommitOptions     Optional);
```

This routine requests that the Transaction associated with TransactionHandle be committed. Any transaction handle that has been opened or created may be committed with Transaction_Commit Desired Access. Since there is no restriction stating that only the creator of a transaction is allowed to commit it.

If the Transaction in question has not been previously issued a PrepareEnlistment request, then a two-phase commit protocol may be initiated on all enlisted RMs. This call can be viewed as a single-phase commit request being issued by the client.

This routing is not called if the Transaction has previously been prepared via PrepareEnlistment. Only an RM that called PrepareEnlistment may resolve the transaction state using the routine SuperiorCommitTransaction.

Arguments:

TransactionHandle: Supplies a handle indicating the Transaction to be committed; and CommitOptions: COMMIT_RETAINING Transaction will be committed.

Return Value:
STATUS_SUCCESS
STATUS_ACCESS_DENIED
STATUS_INVALID_HANDLE
STATUS_INSUFFICIENT_RESOURCES
STATUS_TM_TRANSACTION_ABORTED
RollbackTransaction

```
(IN PHANDLE           TransactionHandle,
 IN SAVEPOINT         SavePoint       Optional,
 IN ROLLBACK_REASON   RollbackReason  Optional);
```

This routine requests that the Transaction associated with TransactionHandle be rolled back. The rollback may be a partial rollback if the optional SavePoint is specified and is a valid savepoint. A NULL SavePoint argument indicates that the Transaction should be completely rolled back, or aborted. An optional RollbackReason structure may be supplied; this will be retained in the Transaction object, and may be retrieved by interested transaction participants via a call to GetInformationTransaction.

Arguments:

TransactionHandle: Supplies a handle indicating the Transaction to be rolled back;

SavePoint: Supplies a SavePoint name, indicating how far a state of a transaction should be rolled back; and RollbackReason: Supplies a rollback reason.

Return Value:
STATUS_SUCCESS
STATUS_ACCESS_DENIED
STATUS_INVALID_HANDLE
STATUS_INSUFFICIENT_RESOURCES
STATUS_TM_TRANSACTION_COMMITTED SavepointTransaction

| (IN PHANDLE | TransactionHandle, | |
|---|---|---|
| IN ULONG | SavepointFlags | Optional, |
| OUT LPSAVEPOINT | SavePoint); | |

This routine requests that a "savepoint" be generated for a Transaction associated with TransactionHandle; this savepoint is used as a target for subsequent rollback requests.
Arguments:
TransactionHandle: Supplies a handle indicating the Transaction for which a Savepoint should be established;
SavepointFlags: Optionally supplies a set of flags that affect the generation of the savepoint; and
SavePoint: Supplies a pointer to a location where a Savepoint identifier is stored.
Return Value:
STATUS_SUCCESS
STATUS_ACCESS_DENIED
STATUS_INVALID_HANDLE
STATUS_INSUFFICIENT_RESOURCES
STATUS_TM_TRANSACTION_COMMITTED
STATUS_TM_TRANSACTION_ABORTED
  QueryInformationTransaction

| (IN | HANDLE | TransactionHandle, |
|---|---|---|
| IN | TRANSACTION_INFORMATION_CLASS | TransactionInformationClass, |
| OUT | PVOID | TransactionInformation, |
| IN | ULONG | TransactionInformationLength, |
| OUT | PULONG | ReturnLength Optional); |

This routine returns requested information about the Transaction object represented by TransactionHandle.
Arguments:
TransactionHandle: Supplies a handle indicating a Transaction for which information is being requested;
TransfactionInformationClass: Indicates what class of information about the Transaction object is being requested;
TransactionInformation: Supplies a pointer to a buffer where the transaction information requested is stored;
TransactionInformationLength: Indicates the length of the buffer pointed to by TransactionInformation; and
ReturnLength: Supplies a pointer to the location that will receive the length of the information written to the TransactionInformation buffer.
Return Value:
STATUS_SUCCESS
STATUS_ACCESS_DENIED
STATUS_INVALID_HANDLE
STATUS_INSUFFICIENT_RESOURCES
STATUS_INVALID_INFO_CLASS
STATUS_INFO_LENGTH_MISMATCH
  SetInformationTransaction

| (IN | HANDLE | TransactionHandle, |
|---|---|---|
| IN | TRANSACTION_INFORMATION_CLASS | TransactionInformationClass, |
| IN | PVOID | TransactionInformation, |
| IN | ULONG | TransactionInformationLength); |

This routine sets the requested information about the Transaction object represented by TransactionHandle.
Arguments:
TransactionHandle: Supplies a handle indicating the Transaction whose information will be modified;
TransactionInformationClass: Indicates which class of information about the Transaction object is being requested;
TransactionInformation: Supplies a pointer to a buffer where the transaction information requested is stored;
TransactionInformationLength: Indicates a length of the buffer pointed to by TransactionInformation; and
ReturnLength: Supplies a pointer to a location that will receive the length of the information written to the TransactionInformation buffer.
Return Value:
STATUS_SUCCESS
STATUS_ACCESS_DENIED
STATUS_INVALID_HANDLE
STATUS_INSUFFICIENT_RESOURCES
STATUS_INVALID_INFO_CLASS
STATUS_INFO_LENGTH_MISMATCH The following includes a more detailed description of the APIs, listed above, to implement operations on RMO kernel objects. The descriptions include a description of the routine, corresponding arguments, and return values.

CreateResourceManager

| (OUT | PHANDLE | ResourceManagerHandle, | |
|---|---|---|---|
| IN | ACCESS_MASK | DesiredAccess | Optional, |
| IN | POBJECT_ATTRIBUTES | ObjectAttributes, | |
| IN | ULONG | CreateOptions | Optional, |
| IN | RM_NOTIFICATION_ROUTINE | NotificationRoutine | Optional); |

This routine creates a new ResourceManager object to represent a resource.

A ResourceManager object also serves as an endpoint for TM notifications regarding Transactions that the RM has joined; an RMs requests these notifications by calling GetNotificationResourceManager.

A ResourceManager is normally a persistent object, i.e., the object must be re-opened and perform recovery after every failure (system or RM). An transient version of a ResourceManager object may be created by specifying the option RESOURCEMANAGER_NO_RECOVERY.

A transient RM is not obligated or permitted to perform recovery. The non-recoverable RM option allows an application or an RM to receive notifications about transaction progress (e.g. PREPREPARE, PREPARE, COMMIT) without being required to implement the full complexity of logging prepares and performing recovery.

Arguments:

ResourceManagerHandle: Supplies a pointer to the location that will receive a handle to the new ResourceManager;

DesiredAccess: Supplies a mask specifying a desired level of access. Valid access mask choices are:

SYNCHRONIZE: to synchronize operations on a handle,

RESOURCE MANAGER_DESTROY: to destroy this resource manager,

RESOURCE MANAGER_READ_ATTRIBUTES: to read attributes associated with a resource manager, RESOURCE MANAGER_WRITE_ATTRIBUTES: to write attributes associated with a resource manager;

ObjectAttributes: Specifies the attributes for the new RM object; this includes the RM name;

CreateOptions: Specifies options for the created object;

RESOURCEMANAGER_NO_RECOVERY: ResourceManager object is non-persistent, and does not perform recovery;

RESOURCEMANAGER_COMMUNICATION: ResourceManager knows how to communicate to other computers. ResourceManager may be used to marshall or unmarshall transactions;

RESOURCEMANAGER_CLUSTER_RECOVERY: ResourceManager knows how to read/deliver outcomes to log files that may have failed over to other nodes in the cluster. ResourceManager may be used to recover transactions in a cluster; and NotificationRoutine: Specifies a notification routine to be called when notifications are available for this ResourceManager.

Return Value:
STATUS_SUCCESS
STATUS_INVALID_PARAMETER
STATUS_OBJECT_NAME_COLLISION
STATUS_OBJECT_NAME_INVALID
STATUS_PRIVILEGE_NOT_HELD
STATUS_INSUFFICIENT_RESOURCES OpenResourceManager

| (OUT | PHANDLE | ResourceManagerHandle, | |
|---|---|---|---|
| IN | ACCESS_MASK | DesiredAccess | Optional, |
| IN | POBJECT_ATTRIBUTES | ObjectAttributes, | |
| IN | ULONG | OpenOptions | Optional, |
| IN | RM_NOTIFICATION_ROUTINE | NotificationRoutine | Optional). |

This routine opens an existing ResourceManager object by name. If a target ResourceManager object is persistent but currently un-opened, the object is initially in a "recovering" state and must be recovered; after recovery is complete, RecoveryCompleteResourceManager must be called.

Arguments:

ResourceManagerHandle: Supplies a pointer to the location that will receive a handle to the existing ResourceManager object;

DesiredAccess: Supplies the mask specifying the desired access to this object;

ObjectAttributes: Specifies the attributes for the new RM object;

OpenOptions: Specifies options for the object. Valid options include:

RESOURCE_MANAGER_DETAILED_RECOVERY_NOTIFICATIONS

The resource manager receives detailed recovery notifications (with additional information about communication endpoints) instead of normal recovery notifications; and NotificationRoutine: Specifies a notification routine that will be called when notifications are available for this ResourceManager.

Return Value:
STATUS_SUCCESS
STATUS_INVALID_PARAMETER
STATUS_OBJECT_NAME_INVALID
STATUS_OBJECT_NAME_NOT_FOUND
STATUS_OBJECT_PATH_SYNTAX_BAD
STATUS_PRIVILEGE_NOT_HELD
STATUS_INSUFFICIENT_RESOURCES.

DestroyResourceManager
(IN PHANDLE ResourceManagerHandle);
This routine destroys a ResourceManager object, causing it to no longer be persistent.
Arguments:
ResourceManagerHandle: Supplies a handle indicating the ResourceManager object to be destroyed.
Return Value:
STATUS_SUCCESS
STATUS_ACCESS_DENIED
STATUS_INVALID_HANDLE
STATUS_INSUFFICIENT_RESOURCES
STATUS_TM_NEEDS_RECOVERY.
QueryInformationResourceManager

| (IN HANDLE | ResourceManagerHandle, |
| IN RESOURCEMANAGER_INFORMATION_CLASS | |
| | ResourceManagerInformationClass, |
| OUT PVOID | ResourceManagerInformation, |
| IN ULONG | ResourceManagerInformationLength, |
| OUT PULONG | ReturnLength    Optional). |

This routine returns the requested information about RMO represented by ResourceManagerHandle.
Arguments:
ResourceManagerHandle: Supplies a handle indicating the ResourceManager for which information is being requested;
ResourceManagerInformationClass: Indicates what class of information about the ResourceManager object is being requested;
ResourceManagerInformation: Supplies a pointer to a buffer where the ResourceManager information requested will be stored;
ResourceManagerInformationLength: Indicates the length of the buffer pointed to by ResourceManagerInformation; and
ReturnLength: Supplies a pointer to the location to receive a length of the information written to the ResourceManagerInformation buffer.
Return Value:
STATUS_SUCCESS
STATUS_ACCESS_DENIED
STATUS_INVALID_HANDLE
STATUS_INSUFFICIENT_RESOURCES
STATUS_INVALID_INFO_CLASS
STATUS_INFO_LENGTH_MISMATCH
SetInformationResourceManager

| (IN HANDLE | ResourceManagerHandle, |
| IN RESOURCEMANAGER_INFORMATION_CLASS | |
| | ResourceManagerInformationClass, |
| IN PVOID | ResourceManagerInformation, |
| IN ULONG | ResourceManagerInformationLength); |

This routine sets the requested information about RMO represented by ResourceManagerHandle.
Arguments:
ResourceManagerHandle: Supplies a handle indicating the ResourceManager for which information is being modified;
ResourceManagerInformationClass: Indicates what class of information about the ResourceManager object is being requested;
ResourceManagerInformation: Supplies a pointer to a buffer where the ResourceManager information requested is stored; and
ResourceManagerInformationLength: Indicates the length of the buffer pointed to by ResourceManagerInformation.
Return Value:
STATUS_SUCCESS
STATUS_ACCESS_DENIED
STATUS_INVALID_HANDLE
STATUS_INSUFFICIENT_RESOURCES
STATUS_INVALID_INFO_CLASS
STATUS_INFO_LENGTH_MISMATCH.
CreateEnlistment

| (IN | PHANDLE | ResourceManagerHandle, |
| IN | PHANDLE | TransactionHandle, |
| IN | NOTIFICATION_MASK | NotificationMask, |
| IN | LPVOID | TransactionKey    Optional); |

This routine causes RMO to "join" a particular transaction, and receive notifications relating to it.
The CreateEnlistment call is idempotent, and an RM can call this routine multiple times in order to change its NotificationMask or TransactionKey. Subsequent calls to CreateEnlistment replace a notification mask and transaction key without creating a new enlistment on the transaction.
NotificationMask may be used to request that notifications be received multiple times. For example, an RM receiving a PREPREPARE notification may request another by calling JoinTransaction and specifying the PREPREPARE flag. Thus, an RM may receive multiple PREPREPARE requests. Such requests may be refused, which may be desirable if the transaction has proceeded past the point the requested notification would have been received. For example, requesting a PREPREPARE when some RM has already been notified to PREPARE cannot be granted.
Arguments:
ResourceManagerHandle: Supplies a handle to an RM to receive notifications about the specified Transaction;
TransactionHandle: Supplies a handle to the Transaction that the RM wishes to Join;
NotificationMask: Specifies the notifications that RM would like to receive regarding this Transaction. Valid masks are as follows, and can be OR-ed together:
TRANSACTION_NOTIFY_MASK_RM: Common notifications desired by an RM (PREPARE, COMMIT, ROLLBACK, SAVEPOINT),
TRANSACTION_NOTIFY_MASK_CRM: Common notifications desired by a CRM or Superior TM (PrePrepare_Complete, PrepareComplete, CommitComplete, RollbackComplete, SavebackComplete),
TRANSACTION_NOTIFY_PREPREPARE: Notification to PrePrepare,
TRANSACTION_NOTIFY_PREPARE: Notification to PREPARE,
TRANSACTION_NOTIFY_COMMIT: Notification to COMMIT,
TRANSACTION_NOTIFY_ROLLBACK: Notification to ROLLBACK,
TRANSACTION_NOTIFY_PREPREPARE_COMPLETE: Notification that PREPREPARE is complete,
TRANSACTION_NOTIFY_PREPARE_COMPLETE: Notification that PREPARE is complete, TRANSACTION_NOTIFY_COMMIT_COMPLETE:
  Notification that COMMIT is complete,
TRANSACTION_NOTIFY_ROLLBACK_COM-
  PLETE: Notification that ROLLBACK is complete,
  and
TRANSACTION_NOTIFY_SAVEPOINT_COM-
  PLETE: Notification that SAVEPOINT is complete;
  and
TransactionKey: Specifies an opaque pointer value that the RM would like to receive along with any notifications for this Transaction. The RM may use this to associate notifications with some object in the RM address space, thus obviating the need to perform a lookup each time a notification occurs.
Return Value:
STATUS_SUCCESS
STATUS_ACCESS_DENIED
STATUS_INVALID_PARAMETER
STATUS_INVALID_HANDLE
STATUS_INSUFFICIENT_RESOURCES
STATUS_TM_TOO_LATE.
  GetNotificationResourceManager

| (IN | PHANDLE | ResourceManagerHandle, |
| IN | PTRANSACTION_NOTIFICATION | TransactionNotification, |
| IN | PLARGE_INTEGER | Timeout Optional); |

This routine queries for and returns an RM notification, if any are available.
Arguments:
ResourceManagerHandle: Supplies a handle indicating the ResourceManager for which a notification should be returned;
TransactionNotification: Supplies a pointer to a TRANSACTION_NOTIFICATION structure to be filled with the first available notification; and
Timeout: Supplies the time until which the caller wishes to block while waiting for a notification to become available. If none are available when this timeout expires, the caller returns with STATUS_TIMEOUT.
Return Value:
STATUS_SUCCESS
STATUS_TIMEOUT
STATUS_ACCESS_DENIED
STATUS_INVALID_HANDLE
STATUS_INSUFFICIENT_RESOURCES.

The following includes a more detailed description of the APIs, listed above, to implement operations on TX kernel objects by RMO kernel objects after joining a transaction. The descriptions include a description of the routine, corresponding arguments, and return values.
  PrePrepareComplete

| (IN | PHANDLE | EnlistmentHandle); |

This routine indicates that RM has competed pre-prepare processing (a.k.a "Phase0") of a Transaction as requested by the KTM
Arguments:
TransactionHandle: Supplies a handle indicating the Transaction for which the pre-prepare operation has been completed.
Return Value:
STATUS_SUCCESS
STATUS_ACCESS_DENIED
STATUS_INVALID_HANDLE
STATUS_INSUFFICIENT_RESOURCES
STATUS_TM_NOT_REQUESTED
  PrepareComplete

| (IN | PHANDLE | EnlistmentHandle); |

This routine indicates that the RM has completed preparing a Transaction as requested by the KTM
Arguments:
TransactionHandle: Supplies a handle indicating the Transaction for which the prepare operation has been completed.
Return Value:
STATUS_SUCCESS
STATUS_ACCESS_DENIED
STATUS_INVALID_HANDLE
STATUS_INSUFFICIENT_RESOURCES
STATUS_TM_NOT_REQUESTED
  RollbackComplete

| (IN | PHANDLE | EnlistmentHandle); |

This routine indicates that RM has successfully competed rolling back the work performed by a Transaction as requested. If RM is unable to successfully rollback the Transaction as requested, it should issue a request for a full rollback via RollbackTransaction.
Arguments:
TransactionHandle: Supplies a handle indicating the Transaction for which the rollback operation has been completed.
Return Value:
STATUS_SUCCESS
STATUS_ACCESS_DENIED
STATUS_INVALID_HANDLE
STATUS_INSUFFICIENT_RESOURCES
STATUS_TM_NOT_REQUESTED
  CommitComplete

| (IN | PHANDLE | EnlistmentHandle); |

This routine indicates that RM has competed committing the work performed by a Transaction as requested.
Arguments:
TransactionHandle: Supplies a handle indicating the Transaction for which the commit operation has been completed.
Return Value:
STATUS_SUCCESS
STATUS_ACCESS_DENIED
STATUS_INVALID_HANDLE
STATUS_INSUFFICIENT_RESOURCES
STATUS_TM_NOT_REQUESTED.

In addition, propagation routines may be provided for the kernel objects. Example of such routines follow.

RegisterProtocolAddressInformation

| (IN | HANDLE | ResourceManager, |
| IN | PROTOCOL_ID | ProtocolId, |
| IN | ULONG | ProtocolInformationSize, |
| IN | PVOID | ProtocolInformation Optional). |

This routine registers a resource manager as a communications resource manager for a particular protocol. It also associates a blob of information with this protocol. Only one resource manager can register for a protocol on a given machine.
Arguments:
ResourceManager: Supplies a handle to the resource manager that we are registering;
ProtocolId: The GUID identifying the protocol;
ProtocolInformationSize: The size of ProtocolInformation;
ProtocolInformation: Optional blob to associate with this protocol;
Return Values:
STATUS_SUCCESS
STATUS_INVALID_HANDLE
MarshallTransaction

| (IN | PHANDLE | TransactionHandle, |
| IN | ULONG | NumberOfProtocols, |
| IN | PPROTOCOL_ID | ProtocolArray, |
| IN | ULONG | BufferLength, |
| IN | PVOID | Buffer, |
| OUT | PULONG | BufferUsed Optional). |

This routine requests that a representation of the Transaction corresponding to TransactionHandle be serialized into a buffer.
Arguments:
TransactionHandle: Supplies a handle indicating the Transaction for which the commit operation has been completed;
NumberOfProtocols: Indicates the size of the protocol array;
ProtocolArray: An array of PROTOCOL_IDs (GUIDs) that specify the protocols that may be used to marshal this transaction. The array should be ordered by preference—the first protocol in the array is the preferred protocol, the second protocol is the second-most-preferred protocol, etc.;
BufferLength: Supplies the length of the Buffer that is available;
Buffer: Supplies a pointer to a buffer where the serialization of the transaction should be stored; and
BufferUsed: Supplies a pointer to a location where the actual bytes written into buffer should be stored.
Return Values:
STATUS_SUCCESS
STATUS_ACCESS_DENIED
STATUS_INVALID_HANDLE
STATUS_INSUFFICIENT_RESOURCES
GetProtocolAddressInformation

| (IN ULONG | AddressBufferSize, |
| OUT PVOID | AddressBuffer, |
| OUT PULONG | AddressBufferUsed Optional). |

This routine requests that the information representing all the registered protocols on the machine be serialized in AddressBuffer. This information can then be passed to another machine, and used as an argument to PushTransaction, to push a transaction to the machine on which the AddressInformation was generated.
Arguments:
AddressBufferSize: Supplies the length of the buffer that is available;
AddressBuffer: Supplies the length of the buffer that is available.
AddressBufferUsed: Supplies a pointer to a location where the buffer where the serialization of the transaction is stored.
Return Value:
STATUS_SUCCESS
STATUS_ACCESS_DENIED
STATUS_INVALID_HANDLE
STATUS_INSUFFICIENT_RESOURCES
PullTransaction

| (OUT PHANDLE | TransactionHandle, |
| IN ULONG | NumberOfProtocols, |
| IN PCRM_PROTOCOL_ID | ProtocolArray, |
| IN ULONG | BufferLength, |
| IN PVOID | Buffer). |

This routine requests that the transaction represented by the serialization in buffer be made available by the transaction manager. A handle to the new Transaction object is returned, after the transaction has been successfully propagated by one of the registered resource managers.
Arguments:
TransactionHandle: Supplies a pointer to where the handle representing the new Transaction should be stored;
NumberOfProtocols: Indicates the size of the protocol array;
ProtocolArray: An array of PROTOCOL_IDs (GUIDs) that specify the protocols that may be used to marshal this transaction. The array should be ordered by preference—the first protocol in the array is the preferred protocol, the second protocol is the second-most-preferred protocol, etc.;
BufferLength: Supplies the length of the buffer that is available;
Buffer: Supplies a pointer to a buffer where the serialization of the transaction is stored.
Return Values:
STATUS_SUCCESS
STATUS_ACCESS_DENIED
STATUS_INVALID_HANDLE
STATUS_INSUFFICIENT_RESOURCES
PushTransaction

| (IN HANDLE | TransactionHandle, |
| IN ULONG | NumberOfProtocols, |
| IN PCRM_PROTOCOL_ID | ProtocolArray, |
| IN ULONG | DestinationInfoLength, |
| IN PVOID | DestinationInfo, |
| IN ULONG | ResponseBufferLength, |
| OUT PVOID | ResponseBuffer, |
| OUT PULONG | ResponseBufferUsed Optional, |
| OUT PULONG | PushCookie Optional). |

This routine requests that the transaction be propagated to the destination machine using push-style propagation. Protocols will be used in the order they are listed in the ProtocolArray, until one succeeds. If no protocol is successful in propagating to the destination machine, the routine will return failure.

Arguments:

TransactionHandle: Supplies a pointer to the transaction object that should be propagated to the remote machine;

DestinationInfoLength: Supplies the length of the DestinationInfoLength that is available;

DestinationInfo: Supplies a pointer to a buffer where the "endpoint" information for the destination is stored. This may be the output received from a call to GetProtocolAddressInformation on the destination machine;

ResponseBufferLength: Supplies the length of the ResponseBuffer that is available;

ResponseBuffer: Supplies a pointer to a buffer where the serialization of the transaction is stored; and PushCookie: Supplies a pointer to a buffer a cookie representing this push request will be stored.

Return Value:
STATUS_SUCCESS
STATUS_ACCESS_DENIED
STATUS_INVALID_HANDLE
STATUS_INSUFFICIENT_RESOURCES
GetPushTransactionBuffer

| (IN HANDLE | TransactionHandle, |
|---|---|
| IN ULONG | PushCookie, |
| IN ULONG | ResponseBufferLength, |
| OUT PVOID | ResponseBuffer, |
| OUT PULONG | ResponseBufferUsed Optional). |

This call is used to retrieve the output of a call to PushTransaction, in the event that the initial call to PushTransaction received a STATUS_BUFFER_TOO_SMALL return code. In that event, the caller is to call GetPushTransactionBuffer, and pass in a sufficient buffer size.

Arguments:

TransactionHandle: Supplies a pointer to the location where the handle representing the new Transaction is to be stored;

BufferLength: Supplies the length of the buffer that is available; and

Buffer: Supplies a pointer to a buffer where the serialization of the transaction is stored.

Return Value:
STATUS_SUCCESS
STATUS_ACCESS_DENIED
STATUS_INVALID_HANDLE
STATUS_INSUFFICIENT_RESOURCES
PropagationComplete

| (IN HANDLE | EnlistmentHandle, |
|---|---|
| IN ULONG | RequestCookie, |
| IN ULONG | BufferLength, |
| IN PVOID | Buffer). |

This routine is called by a CRM after it has successfully completed propagating a transaction.

Arguments:

TransactionHandle: Supplies a pointer to the location where the handle representing the new Transaction is to be stored;

RequestCookie: Supplies the RequestCookie that was received in the original PROPAGATE notification argument, to indicate which request has been completed;

BufferLength: Supplies the length of the Buffer that is available; and

Buffer: Supplies a pointer to a buffer where the serialization of the transaction is stored.

Return Value:
STATUS_SUCCESS
STATUS_ACCESS_DENIED
STATUS_INVALID_HANDLE
STATUS_INSUFFICIENT_RESOURCES
PropagationFailed

| (IN HANDLE | ResourceManagerHandle, |
|---|---|
| IN ULONG | RequestCookie, |
| IN STATUS | PropStatus). |

A CRM uses this routine to indicate that it has failed to propagate the transaction as requested.

Arguments:

TransactionHandle: Supplies a pointer to the location where the handle representing the new transaction is to be stored;

BufferLength: Supplies the length of the Buffer that is available; and

Buffer: Supplies a pointer to a buffer where the serialization of the transaction is stored.

Return Value:
STATUS_SUCCESS
STATUS_ACCESS_DENIED
STATUS_INVALID_HANDLE
STATUS_INSUFFICIENT_RESOURCES.

Example Computing Environment

Figure 9:
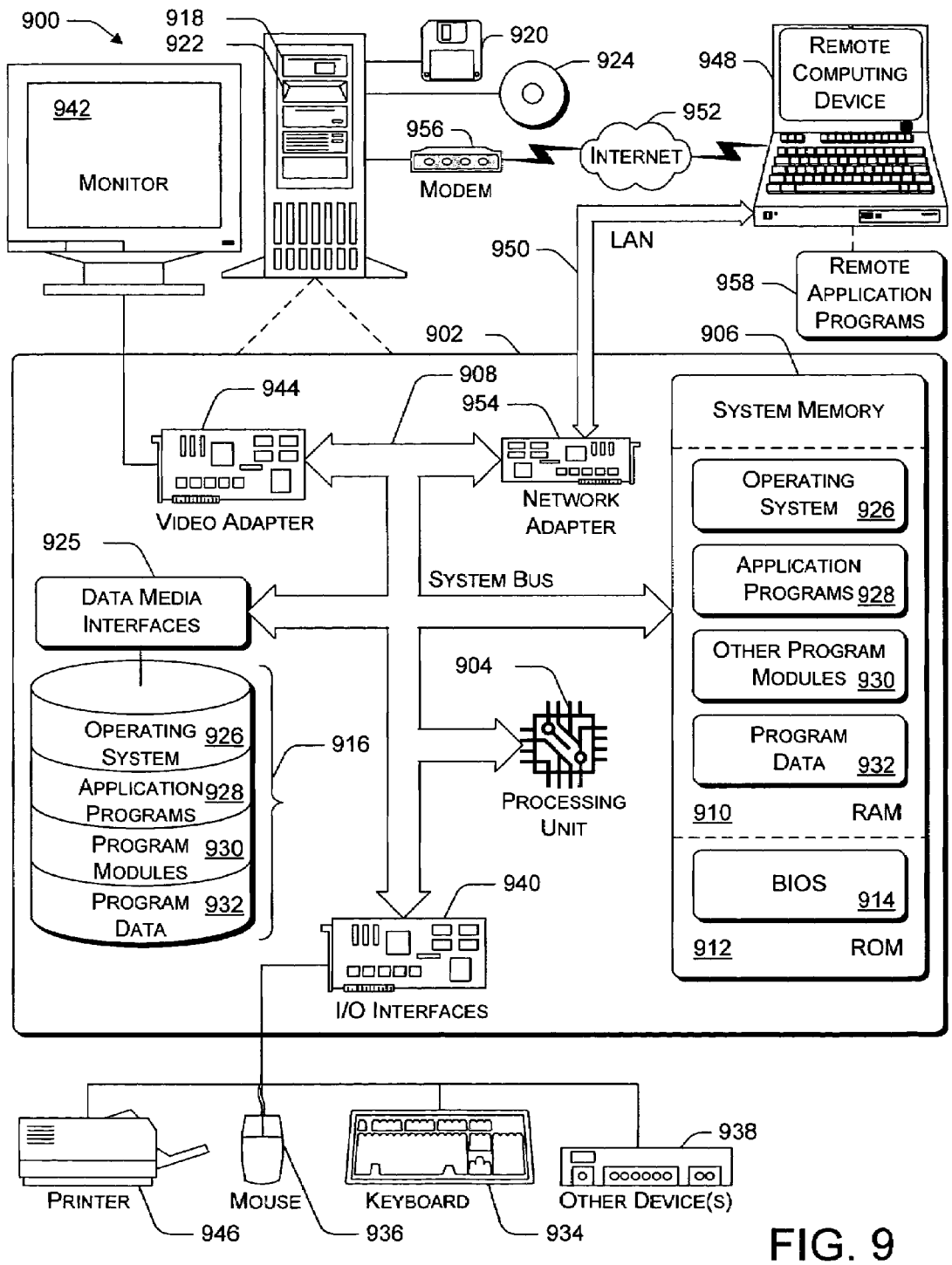
FIG. 9 shows a general computer environment that can be used to implement techniques described herein, according to various embodiments.

FIG. 9 illustrates a general computer environment 900, which can be used to implement the techniques described herein. The computer environment 900 is only one example of a computing environment and is not intended to suggest any limitation as to the scope of use or functionality of the computer and network architectures. Neither should the computer environment 900 be interpreted as having any dependency or requirement relating to any one or combination of components illustrated in the example computer environment 900.

Computer environment 900 includes a general-purpose computing device in the form of a computer 902. The components of computer 902 can include, but are not limited to, one or more processors or processing units 904, system memory 906, and system bus 908 that couples various system components including processor 904 to system memory 906.

System bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394, i.e., FireWire, bus.

Computer 902 may include a variety of computer readable media. Such media can be any available media that is accessible by computer 902 and includes both volatile and non-volatile media, removable and non-removable media.

System memory 906 includes computer readable media in the form of volatile memory, such as random access memory (RAM) 910; and/or non-volatile memory, such as read only memory (ROM) 912 or flash RAM. Basic input/output system (BIOS) 914, containing the basic routines that help to transfer information between elements within computer 902, such as during start-up, is stored in ROM 912 or flash RAM. RAM 910 typically contains data and/or program modules that are immediately accessible to and/or presently operated on by processing unit 904.

Computer 902 may also include other removable/non-removable, volatile/non-volatile computer storage media. By way of example, FIG. 9 illustrates hard disk drive 916 for reading from and writing to a non-removable, non-volatile magnetic media (not shown), magnetic disk drive 918 for reading from and writing to removable, non-volatile magnetic disk 920 (e.g., a "floppy disk"), and optical disk drive 922 for reading from and/or writing to a removable, non-volatile optical disk 924 such as a CD-ROM, DVD-ROM, or other optical media. Hard disk drive 916, magnetic disk drive 918, and optical disk drive 922 are each connected to system bus 908 by one or more data media interfaces 925. Alternatively, hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, removable magnetic disk 920, and removable optical disk 924, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 916, magnetic disk 920, optical disk 924, ROM 912, and/or RAM 910, including by way of example, operating system 926, one or more application programs 928, other program modules 930, and program data 932. Each of such operating system 926, one or more application programs 928, other program modules 930, and program data 932 (or some combination thereof) may enact transactions, in accordance with the example embodiments described above, to implement all or part of the resident components that support the distributed file system.

A user can enter commands and information into computer 902 via input devices such as keyboard 934 and a pointing device 936 (e.g., a "mouse"). Other input devices 938 (not shown specifically) may include a microphone, joystick, game pad, satellite dish, serial port, scanner, and/or the like. These and other input devices are connected to processing unit 904 via input/output interfaces 940 that are coupled to system bus 908, but may be connected by other interface and bus structures, such as a parallel port, game port, or a universal serial bus (USB).

Monitor 942 or other type of display device can also be connected to the system bus 908 via an interface, such as video adapter 944. In addition to monitor 942, other output peripheral devices can include components such as speakers (not shown) and printer 946 which can be connected to computer 902 via I/O interfaces 940.

Computer 902 can operate in a networked environment using logical connections to one or more remote computers, such as remote computing device 948. By way of example, remote computing device 948 can be a PC, portable computer, a server, a router, a network computer, a peer device or other common network node, and the like. Remote computing device 948 is illustrated as a portable computer that can include many or all of the elements and features described herein relative to computer 902. Alternatively, computer 902 can operate in a non-networked environment as well.

Logical connections between computer 902 and remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, computer 902 is connected to local network 950 via network interface or adapter 954. When implemented in a WAN networking environment, computer 902 typically includes modem 956 or other means for establishing communications over wide network 952. Modem 956, which can be internal or external to computer 902, can be connected to system bus 908 via I/O interfaces 940 or other appropriate mechanisms. The illustrated network connections are examples and other means of establishing at least one communication link between computers 902 and 948 can be employed.

In a networked environment, such as that illustrated with computing environment 900, program modules depicted relative to computer 902, or portions thereof, may be stored in a remote memory storage device. By way of example, remote application programs 958 reside on a memory device of remote computer 948. For purposes of illustration, applications or programs and other executable program components such as the operating system are illustrated herein as discrete blocks, although it is recognized that such programs and components reside at various times in different storage components of computing device 902, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed:

1. A computing system comprising:
  a redirector residing on a local device operable to receive a request to perform a file operation on a file residing on a remote device that is coupled to the local device, and to look up a transaction from the request;
  a transaction manager to marshall the transaction effective to allow the redirector to send the marshalled transaction and the requested file operation to the remote device to retrieve a file operation result that was otherwise unavailable on the local device.

2. A computing system according to claim 1, wherein the transaction manager is not integrated into a file system.

3. A computing system according to claim 1, wherein the redirector is operable to receive the file operation result including file information from the remote device that includes a file system identifier (Fid) and a version identifier associated with the file.

4. A computing system according to claim 3, wherein the redirector is operable to selectively create a file control block (FCB) associated with the file, the FCB including the Fid and version identifier information associated with the file.

5. A computing system according to claim 4, wherein the redirector is operable to determine whether an existing FCB can be used for the request.

6. A computing system according to claim 5, wherein the redirector is operable to determine whether an existing FCB that is associated with an uncommitted transaction can be used for the request.

7. A computing system according to claim 5, wherein the redirector, in determining whether an existing FCB can be used for the request, is operable to compare a pathname and transaction context for the request with a pathname associated with the existing FCB.

8. A computing system according to claim 1, wherein the transaction manager is a kernel level transaction manager.

9. A computing system according to claim 1, wherein the redirector is operable to selectively indicate in the request that the remote device should signal the local machine responsive to a file operation being performed on the file that was not requested by the redirector.

10. A computing system according to claim 1, wherein the redirector sends the transaction with request using a protocol based on a server message block (SMB) protocol.

11. A computing system according to claim 10, wherein the protocol supports non-transacted remote file operations.

12. A computer-readable medium having stored thereon components as recited in claim 1.

13. A computing system comprising:
  a server component (SRV) resident on a local device and operable to receive a request from a remote device via a network coupling, the request being for a transacted file operation on a file residing in the local device;
  a transaction manager resident at the local device and operable to communicate transaction messages relating to the transacted file operation to the remote device; and
  a file system resident at the local device and operable to perform the requested transacted file operation on the file responsive to the SRV component and transaction manager effective to generate a transacted file operation result on behalf of the remote device.

14. A computing system according to claim 13, wherein the SRV component provides a file system identifier (Fid) and a version identifier associated with the file to the remote device.

15. A computing system according to claim 13, wherein the transaction manager is a kernel level transaction manager.

16. A computing system according to claim 13, wherein the file system is operable to selectively cause the SRV component to signal the remote device responsive to a file operation being performed on the file that was no requested by the remote device.

17. A computing system according to claim 13, wherein the SRV component sends the transaction with the request using a protocol based on a server message block (SMB) protocol.

18. A computing system according to claim 17, wherein the protocol supports non-transacted remote file operations.

19. A computer-readable medium having stored thereon components as recited in claim 13.

20. A computer implemented method comprising:
  receiving a request for a file operation;
  determining whether a corresponding file resides on a local device or a remote device that is coupled to the local device; retrieving a transaction for the operation; marshalling the transaction; in an instance, where the file resides on the remote device, sending the marshalled transaction with the request to the remote device over a network; and receiving from the remote device information resulting from the file operation that was otherwise unavailable to the local device.

21. A computer implemented method according to claim 20, wherein the information received from the remote device includes a file identifier (Fid) and a version identifier.

22. A computer implemented method according to claim 21, wherein receiving a request for a transacted file operation further comprises:
providing a name for the request if the request is for a file operation on the remote device; and selectively creating a file control block (FCB) associated with the file, the FCB including the Fid and version identifier information associated with the file.

23. A computer implemented method according to claim 22, wherein selectively creating a FCB further comprises determining whether an existing FCB can be used for the request.

24. A computer implemented method according to claim 23, wherein determining whether an existing FCB can be used for the request further comprises determining whether the existing FCB is associated with an uncommitted transaction.

25. A computer implemented method according to claim 23, wherein determining whether an existing FCB can be used for the request, further comprises comparing a path name and transaction context for the request with a pathname associated with the existing FCB.

26. A computer implemented method according to claim 20, wherein the method is performed in a kernel mode.

27. A computer implemented method according to claim 20, further comprising selectively indicating in the request that the remote device should signal the local device in response to a file operation being performed on the file that was requested by a device other than the local device.

28. A computer implemented method according to claim 20, wherein the transaction is sent with the request using a protocol based on a server message block (SMB) protocol.

29. A computer implemented method according to claim 28, wherein the protocol supports non-transacted remote file operations.

30. A computer-readable medium having computer-executable instructions to perform operations comprising:
receiving a request for a transacted file operation;
determining whether a corresponding file resides on a local device or a remote device that is coupled to the local device;
retrieving a transaction corresponding to the file operation;
marshalling the transaction;
in an instance, where the file resides on the remote device, sending the marshalled transaction with the request to a remote device over a network; and
receiving from the remote device information resulting from the transacted file operation that was otherwise unavailable on the local device.

31. A computer-readable medium according to claim 30, wherein the information received from the remote device includes a file identifier (Fid) and a version identifier.

32. A computer-readable medium according to claim 31, wherein receiving a request for a transacted file operation further comprises:
providing a name for the request if the request is for a file operation on the remote device; and
selectively creating a file control block (FCB) associated with the file, the FCB including the Fid and version identifier information associated with the file.

33. A computer-readable medium according to claim 32, wherein selectively creating a FCB further comprises determining whether an existing FCB can be used for the request.

34. A computer-readable medium according to claim 33, wherein determining whether an existing FCB can be used for the request further comprises determining whether the existing FCB is associated with an uncommitted transaction.

35. A computer implemented method comprising:
receiving a pre-prepare notification from a transaction manager residing in a first computing platform;
providing file operation data from the first computing platform to a second computing platform; receiving a prepare notification from the transaction manager residing in the first computing platform; and providing a message to the second computing platform containing the prepare notification via the network effective to allow transacted file information to be obtained on behalf of the first computing platform.

36. A computer implemented method comprising:
receiving a pre-prepare notification associated with a transaction from a first computing platform at a second computing platform; providing the pre-prepare notification to a transaction manager residing in the second computer platform;
receiving file operation data associated with the transaction from the first computing platform at the second computing platform; providing the file operation data to a file system residing in the second computing platform; receiving a prepare notification from the first computing platform; and providing the prepare notification to the transaction manager residing in the second computing platform effective to allow transacted file information to be obtained on behalf of the first computing platform.

37. The computer implemented method of claim 36 wherein the prepare notification causes the second computing platform to store the file operation data in a manner that allows the file operation data to be either committed or rolled-back.

38. The computer implemented method of claim 36 wherein the pre-prepare notification causes the second computing platform to flush any caches of the second computing platform associated with the transaction.

* * * * *